United States Patent
Watanabe et al.

(10) Patent No.: US 7,234,813 B2
(45) Date of Patent: Jun. 26, 2007

(54) APPARATUS FOR DISPLAYING IMAGE BY PROJECTION ON RETINA OF VIEWER WITH ELIMINATED ADVERSE EFFECT OF INTERVENING OPTICS

(75) Inventors: Mitsuyoshi Watanabe, Hashima (JP); Shoji Yamada, Konan (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/135,362

(22) Filed: May 24, 2005

(65) Prior Publication Data

US 2005/0234348 A1 Oct. 20, 2005

Related U.S. Application Data

(63) Continuation of application No. PCT/JP03/14228, filed on Nov. 7, 2003.

(30) Foreign Application Priority Data

Nov. 27, 2002 (JP) ............................. 2002-344008

(51) Int. Cl.
*A61B 3/00* (2006.01)
*G02B 26/08* (2006.01)

(52) U.S. Cl. .................... 351/200; 351/246; 245/7; 245/8; 245/9; 348/115; 348/750; 348/755; 348/757; 356/124; 359/196

(58) Field of Classification Search ................ 351/200, 351/246; 345/7–9; 348/115, 750, 755, 757; 356/124; 359/196, 237
See application file for complete search history.

(56) References Cited

U.S. PATENT DOCUMENTS

| | | | | | |
|---|---|---|---|---|---|
| 5,467,104 | A | * | 11/1995 | Furness et al. | 345/8 |
| 5,596,339 | A | * | 1/1997 | Furness et al. | 345/8 |
| 5,659,327 | A | * | 8/1997 | Furness et al. | 345/8 |
| 5,790,284 | A | * | 8/1998 | Taniguchi et al. | 345/8 |
| 6,008,781 | A | * | 12/1999 | Furness et al. | 345/8 |
| 6,088,102 | A | * | 7/2000 | Manhart | 356/499 |
| 6,177,966 | B1 | * | 1/2001 | Masuda et al. | 349/8 |
| 6,538,625 | B2 | * | 3/2003 | Tidwell et al. | 345/8 |
| 6,657,763 | B2 | * | 12/2003 | Kobayashi | 359/212 |
| 2004/0196213 | A1 | * | 10/2004 | Tidwell et al. | 345/8 |

FOREIGN PATENT DOCUMENTS

| JP | B2 2874208 | 4/1991 |
|---|---|---|
| JP | A 11-142763 | 5/1999 |
| JP | A 2001-4809 | 1/2001 |

\* cited by examiner

*Primary Examiner*—Evelyn A. Lester
(74) *Attorney, Agent, or Firm*—Oliff & Berridge, PLC

(57) ABSTRACT

An apparatus for use in image display, of projecting a light beam onto a retina of a viewer, to thereby allow the viewer to perceive an image, is disclosed. The apparatus is constructed to include: a light emitter emitting a light beam; a scanner scanning the light beam emitted by the light emitter; an optical system receiving the light beam scanned by the scanner as an incoming light beam, and emitting the received incoming light beam as an outgoing light beam, such that, upon modulation of the light beam with respect to a traveling direction of the light beam, the outgoing light beam is directed to a pupil of the viewer; and a curvature compensator compensating a wavefront curvature of the incoming light beam.

10 Claims, 12 Drawing Sheets

APPARATUS FOR DISPLAYING IMAGE BY PROJECTION ON RETINA OF VIEWER WITH ELIMINATED ADVERSE EFFECT OF INTERVENING OPTICS

This application is based on Japanese Patent Application No. 2002-344008 filed Nov. 27, 2002, and PCT International Application No. PCT/JP2003/14228 filed Nov. 7, 2003, the contents of which are incorporated hereinto by reference.

CROSS-REFERENCE TO RELATED APPLICATIONS

This is a continuation of International Application PCT/JP2003/14228 filed Nov. 7, 2003, which was published in Japanese under PCT Article 21(2).

BACKGROUND OF THE INVENTION

1. Field of the Invention

The invention relates to an apparatus for projecting an image onto the retina of a viewer's eye thereby allowing the viewer to perceive the image.

2. Description of the Related Art

There have been recently presented various types of image display apparatuses each projecting an image by scanning a light beam on the retina of a viewer's eye to thereby allow the viewer to perceive the image, which are each called, "Retinal Scanning Display."

For example, Japanese Patent Publication No. HEI 11-142763 discloses a conventional image display apparatus including a scanning optical device scanning laser light in two-dimension; and optics (an optical device for light convergence) causing the laser light scanned by the scanning optical device to converge at a point in a viewer's eyeball.

The above conventional image display apparatus employs as the aforementioned optics, a semi-transparent mirror having its reflective surface formed as a portion of an ellipsoidal surface of revolution, which is a concave curved surface. Owing to the nature of the ellipsoidal surface of revolution having its two foci, a light beam, upon entry from one of the two foci into a point on the ellipsoidal surface of revolution, enters the other focus without exception.

In light of the above fact, the above conventional image display apparatus is configured such that one of the two foci of the ellipsoidal surface of revolution is coincident in position with a reflection point at which the laser light is reflected off the aforementioned scanning optical device, while the other focus is coincident in position with a convergence point at which the laser light is converged by the aforementioned optics within viewer's eyeball, thereby securing the laser light scanned by the scanning optical device to converge within the viewer's eyeball.

BRIEF SUMMARY OF THE INVENTION

Such a type of an image display apparatus, when practiced, allows a viewer to visually perceive that a luminance point (a light emission point) is positioned at a point obtained by extending back a light beam incident on the retina of the viewer by a distance equal to the radius of the wavefront curvature of the incident laser beam. As a result, the viewer obtains a depth perception in conformity with the wavefront curvature of the light beam projected onto the retina.

Such a type of an image display apparatus, when practiced with all the pixels of an image sharing the same wavefront curvature of the light beam incident on the retina, allows the two-dimensional presentation of the image to the viewer. In contrast, such a type of an image display apparatus, when practiced with not all the pixels of an image sharing the same wavefront curvature of the light beam incident on the retina, allows the three-dimensional presentation of the image to the viewer.

However, when the aforementioned conventional image display apparatus is practiced using the aforementioned optics which is disclosed in the aforementioned Japanese Patent Publication as having the aforementioned shape, the ununiformity in curvature of the reflective surface of the optics causes the amount or degree of change in wavefront curvature (the amount of deviation of the wavefront curvature) of the laser light between before and after reflection by the reflective surface, to be varied with changes in entrance position (reflection position) at which the laser light enters the reflective surface. For this reason, the conventional image display apparatus fails to allow the viewer to perceive an image accurately.

That is to say, conventionally, such a type of an image display apparatus that a scanned light beam, upon affected by optics, is incident on the retina of a viewer, tends to unwantedly modify the wavefront curvature of the light beam, the reasons of which include, in addition to the optical properties of the optics, deformation of the optics due to the temperature, variations in wavelength of the light beam due to the temperature, replacement of the optics, etc.

It is therefore an object of the present invention to provide an image display apparatus in which a scanned light beam, after affected by intervening optics, enters the retina of a viewer, and which allows the viewer to perceive an image accurately, irrespective of the intervening optics, while eliminating an adverse effect of the intervening optics on the wavefront curvature of the light beam entering the retina of the viewer.

According to the present invention, there is provided an apparatus for use in image display, of projecting a light beam onto a retina of a viewer, to thereby allow the viewer to perceive an image, the apparatus comprising:

a light emitter emitting a light beam;

a scanner scanning the light beam emitted by the light emitter;

an optical system receiving the light beam scanned by the scanner as an incoming light beam, and emitting the received incoming light beam as an outgoing light beam, such that, upon modulation of the light beam with respect to a traveling direction of the light beam, the outgoing light beam is directed to a pupil of the viewer; and a curvature compensator compensating a wavefront curvature of the incoming light beam.

The above apparatus allows the compensation of the wavefront curvature of the incoming light beam which attempts to enter the optical system. This results in the capability of optimizing the wavefront curvature of the incoming light beam which attempts to enter the optical system, so as to achieve a desired value of the wavefront curvature of the outgoing light beam emitted from the optical system, in the case where the light beam, upon entry into the optical system, is unwantedly modified in wavefront curvature by the optical system.

Therefore, the above apparatus facilitates the viewer's accurate perception of an image, despite of the existing optical system affecting the wavefront curvature of the light beam.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
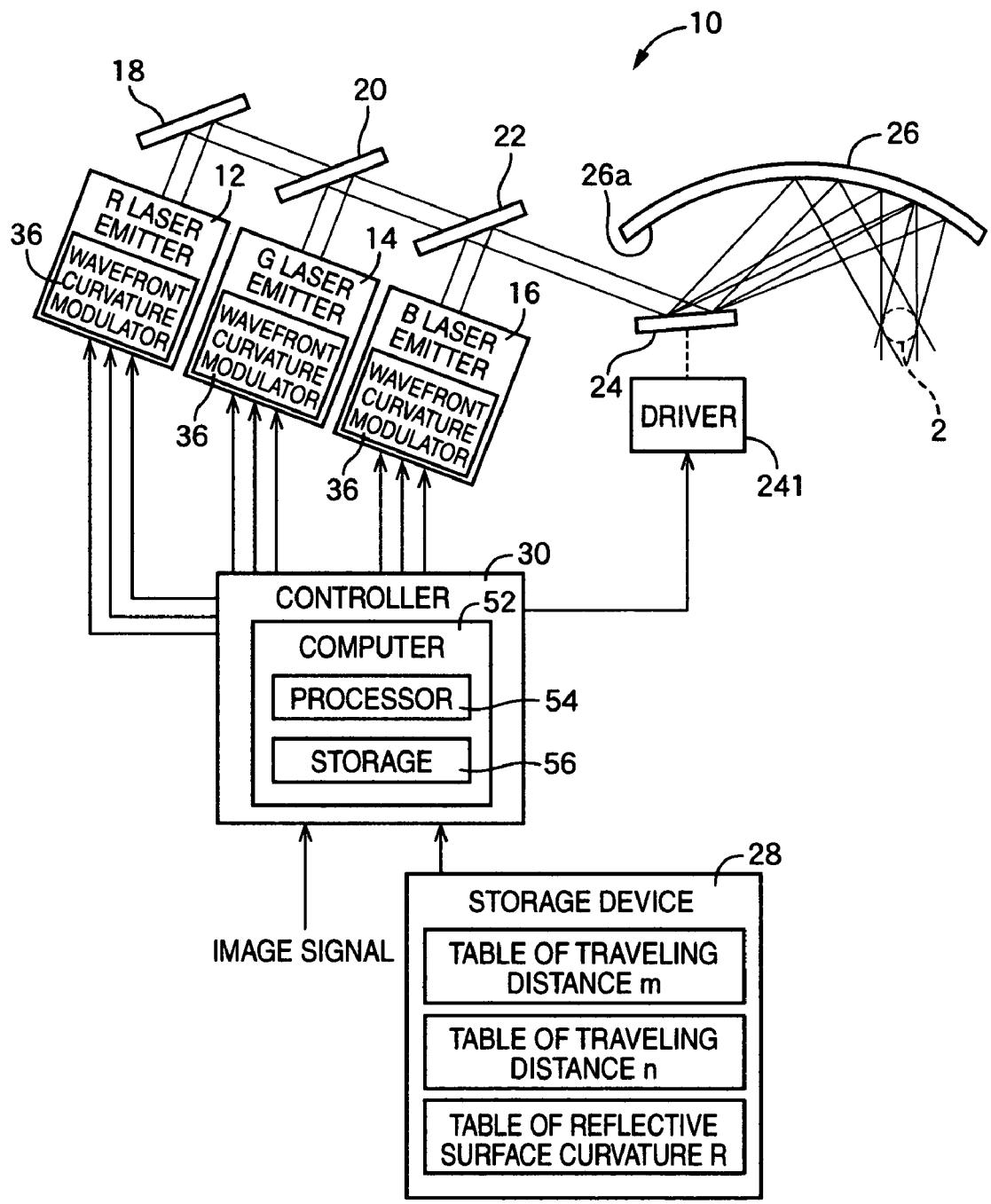
FIG. 1 schematically illustrates the construction of a retinal scanning display constructed according to a first embodiment of the present invention.

The object mentioned above may be achieved according to any one of the following modes of this invention.

These modes will be stated below such that these modes are sectioned and numbered, and such that these modes depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the selected modes of the invention in such a dependent form as to depend from the other mode or modes does not exclude a possibility of the technological features in a dependent-form mode to become independent of those in the corresponding depended mode or modes and to be removed therefrom. It should be interpreted that the technological features in a dependent-form mode is allowed to become independent according to the nature of the corresponding technological features, where appropriate.

(1) An apparatus for use in image display, of projecting a light beam onto a retina of a viewer, to thereby allow the viewer to perceive an image, the apparatus comprising:

a light emitter emitting a light beam;

a scanner scanning the light beam emitted by the light emitter;

an optical system receiving the light beam scanned by the scanner as an incoming light beam, and emitting the received incoming light beam as an outgoing light beam, such that, upon modulation of the light beam with respect to a traveling direction of the light beam, the outgoing light beam is directed to a pupil of the viewer; and a curvature compensator compensating a wavefront curvature of the incoming light beam.

The apparatus according to the above mode (1) allows the compensation of the wavefront curvature of the incoming light beam which attempts to enter the optical system. This results in the capability of optimizing the wavefront curvature of the incoming light beam which attempts to enter the optical system, so as to achieve a desired value of the wavefront curvature of the outgoing light beam emitted from the optical system, in the case where the light beam, upon entry into the optical system, is unwantedly modified in wavefront curvature by the optical system.

Therefore, the apparatus according to the above mode (1) facilitates the viewer's accurate perception of an image, despite of the existing optical system affecting the wavefront curvature of the light beam.

The "curvature compensator" set forth in the above mode (1) may be practiced in a mode, for example, that the wavefront curvature of the incoming light beam which attempts to enter the optical system, based on at least one of an entrance position at which the incoming light beam enters the optical system; a physical quantity affecting the amount of change in wavefront curvature (the amount of deviation of the wavefront curvature) of the light beam occurring when the light beam travels via the optical system; and the type of the currently-used optical system.

The "optical system" set forth in the above mode (1) and the following modes may be for example a mirror, a lens, a diffractive optical device, etc.

(2) The apparatus according to mode (1), wherein the curvature compensator compensates the wavefront curvature of the incoming light beam, based on an entrance position at which the incoming light beam enters the optical system.

The apparatus according to the above mode (2), despite of the fact that the amount or degree of change in wavefront curvature of the light beam due to the optical system is varied with changes in entrance position at which the incoming light beam enters the optical system, allows the compensation of the wavefront curvature of the incoming light beam entering the optical system, to achieve a desired value of wavefront curvature of the outgoing light beam directed to the retina of the viewer.

Therefore, the apparatus according to the above mode (2), despite of the fact that the amount or degree of change in wavefront curvature of the light beam due to the optical system is varied with changes in entrance position at which the incoming light beam enters the optical system, facilitates the viewer's accurate perception of an image.

(3) The apparatus according to mode (2), wherein the curvature compensator compensates the wavefront curvature of the incoming light beam, to achieve a desired value of wavefront curvature of the outgoing light beam advancing toward the pupil of the viewer, based on optical property information defining a relationship between the entrance position and an amount of change in wavefront curvature of the light beam occurring when the light beam travels via the optical system.

The "optical property information" set forth in the above mode (3) and the following modes is enough if it can specify the relationship between the entrance position of the light beam on the optical system and the amount or the degree of change in wavefront curvature of the instant light beam due to the optical system. Therefore, the "optical property information" may be of course information indicating the relationship between the entrance position of the light beam and the amount or the degree of change in wavefront curvature due to the optical system, and alternatively, the "optical property information" may be, for example, information indicating the relationship between the state of operation of the scanner and the amount of change in wavefront curvature of the light beam traveling via the optical system, or information indicating the relationship between the entrance position of the light beam on the optical system and the refracting power of the optical system.

(4) The apparatus according to mode (2), further comprising a storage storing optical property information defining a relationship between the entrance position and an amount of change in wavefront curvature of the light beam occurring when the light beam travels via the optical system, and wherein the curvature compensator compensates the wavefront curvature of the incoming light beam, to achieve a desired value of a wavefront curvature of the outgoing light beam advancing toward the pupil of the viewer, based on the optical property information stored in the storage.

(5) The apparatus according to any one of modes (1)–(4), wherein the light emitter comprises:

a light emitting device emitting the light beam; and a curvature modulator modulating a wavefront curvature of the light beam emitted by the light emitting device, and wherein the curvature compensator compensates the wavefront curvature of the incoming light beam, using the curvature modulator.

The apparatus according to the above mode (5) allows the wavefront curvature of the light beam to be compensated by the modulation of the wavefront curvature of the light beam, with the result that the compensation of the wavefront curvature does not require the preparation of a plurality of light emitters emitting a plurality of kinds of light beams different in wavefront curvature, respectively.

The "curvature modulator" set forth in the above mode (5) may be easily practiced in a mode allowing a continuous modulation of the wavefront curvature, than when the modulation of the wavefront curvature is achieved by the selection of a plurality of light emitters emitting a plurality of kinds of light beams different in wavefront curvature, respectively. This mode facilitates improvement in compensation accuracy of the wavefront curvature and eventually improvement in display accuracy of an image.

(6) The apparatus according to mode (5), further comprising a controller controlling the curvature modulator for displaying the image, the controller including as the curvature compensator a portion compensating the wavefront curvature of the incoming light beam.

The apparatus according to the above mode (6) allows the same curvature modulator to perform both an image display and the compensation of the wavefront curvature, resulting in an easier reduction in number of the components of the image display apparatus, when compared with the case where separate curvature modulators perform an image display and the compensation of the wavefront curvature, respectively.

(7) The apparatus according to any one of modes (1)–(4), wherein the light emitter comprises:

a plurality of light emitting devices emitting a plurality of light beams different in wavefront curvature from each other, respectively; and a selector selecting one of the plurality of light emitting devices as an active light emitting device, and wherein the curvature compensator compensates the wavefront curvature of the incoming light beam, using the selector.

The apparatus according to the above mode (7) does not require changing the wavefront curvature of the same light beam from a value to a different value, for achieving the compensation of the wavefront curvature. Therefore, the apparatus allows reduction in time required for changing the wavefront curvature, resulting in an easier achievement of the compensation of the wavefront curvature for a shortened length of time.

Accordingly, the apparatus according to the above mode (7), even when distinct changes in depth to be perceived by a viewer occur when moving in a scanning direction on a pixel-by-pixel basis, for example, makes it easier to compensate the wavefront curvature so as to follow up expeditiously such changes in depth.

(8) The apparatus according to mode (7), further comprising a controller controlling the selector for displaying the image, the controller including as the curvature compensator a portion compensating the wavefront curvature of the incoming light beam, using the selector.

The apparatus according to the above mode (8) allows the same selector to perform both an image display and the compensation of the wavefront curvature, resulting in an easier reduction in number of the components of the image display apparatus, when compared with the case where separate selectors perform an image display and the compensation of the wavefront curvature, respectively.

(9) The apparatus according to any one of modes (1)–(8), wherein the curvature compensator compensates the wavefront curvature of the incoming light beam, based on a physical quantity affecting an amount of change in wavefront curvature of the light beam occurring when the light beam travels via the optical system.

In the image display apparatus according to any one of the preceding modes (1)–(8), the amount or the degree of change in wavefront curvature of the light beam due to the optical system can be varied with changes in physical quantity relating to the optical system, such as temperature, humidity, etc.

Based on the above findings, the apparatus according to the above mode (9) allows the wavefront curvature of the incoming laser beam which attempts to enter the optical system to be compensated based on the physical quantity affecting the amount of change in wavefront curvature of the light beam due to the optical system.

Therefore, the apparatus according to the above mode (9) provides facilitation in compensating the wavefront curvature in conformity with the actual optical property of the optical system.

The "physical quantity" set forth in the above mode (9) is not limited in kind, only if it is a physical quantity affecting the amount of change in wavefront curvature due to the optical system.

More specifically, the "physical quantity" may be a physical quantity representative of properties of the optical system as such, such as the temperature and/or the humidity of the optical system as such, etc., or may be a physical quantity representative of properties of environment in which the optical system is situated, such as the temperature and/or the humidity of air through which the incoming or outgoing light beam of the optical system propagates. The "physical quantity" may be other than temperature and humidigy.

(10) The apparatus according to mode (9), wherein the curvature compensator compensates the curvature of the wavefront of the incoming light beam, based on an entrance position at which the incoming light beam enters the optical system, and the physical quantity.

The apparatus according to the above mode (10) allows the wavefront curvature of the incoming light beam which attempts to enter the optical system to be modified so as to conform with both the entrance position of the incoming light beam and the physical quantity affecting the amount of change in wavefront curvature of the light beam due to the optical system.

(11) The apparatus according to mode (10), further comprising a detector detecting a value of the physical quantity, and wherein the curvature compensator compensates the wavefront curvature of the incoming light beam, based on the entrance position, and the detected value of the physical quantity.

(12) The apparatus according to mode (10), further comprising:

a detector detecting a value of the physical quantity; and a storage storing a plurality of sets of optical property information each defining a relationship between an entrance position at which the incoming light beam enters the optical system, and an amount of change in wavefront curvature of the light beam occurring when the light beam travels via the optical system, for a plurality of values which the physical quantity can take, respectively, and wherein the curvature compensator compensates the wavefront curvature of the incoming light beam, based on one of the plurality of sets of optical property information which corresponds to the detected value of the physical quantity.

(13) The apparatus according to any one of modes (1)–(12), wherein the optical system is a selected one of a plurality of optical systems each having a distinct optical property with respect to an amount of change in wavefront curvature of the light beam occurring when the light beam travels via each optical system, and wherein the curvature compensator compensates the wavefront curvature of the incoming light beam, based on the distinct optical property of the selected optical system.

The apparatus according to the above mode (13) may be practiced to distinguish the uses of the plurality of optical systems depending on the selected applications, purposes, etc.

Additionally, the apparatus according to the above mode (13) is capable of accommodating the distinct optical property of the currently-selected one of the plurality of optical systems, by compensating the wavefront curvature, while preventing the exchange of the optical systems from causing an inadequate wavefront curvature.

(14) The apparatus according to mode (13), wherein the curvature compensator compensates the wavefront curvature of the incoming light beam, based on an entrance position at which the incoming light beam enters the selected optical system, and the distinct optical property of the selected optical system.

The apparatus according to the above mode (14) allows the wavefront curvature of the incoming light beam which attempts to enter the selected optical system to be changed in conformity with both the entrance position and the distinct optical property of the selected optical system.

(15) The apparatus according to mode (14), further comprising a storage storing optical property information defining a relationship between the entrance position and the amount of change in wavefront curvature, in a manner allowing the optical property information to be modified according to the distinct optical property of the selected optical system, and wherein the curvature compensator compensates the wavefront curvature of the incoming light beam, based on the optical property information modified according to the distinct optical property of the selected optical system.

The "manner allowing the optical property information to be modified" set forth in the above mode (15) may be implemented in an arrangement in which the "storage portion" set forth in the above mode (15) has previously stored therein a plurality of sets of optical property information different in content, in association with the plurality of optical systems, respectively. Each set of optical property information defines a relationship between the possible entrance positions of the incoming light beam on the optical systems, and the possible amounts of change in wavefront curvature due to the optical systems. Further, in this arrangement, each time that the optical systems are exchanged, one of the plurality of sets of optical property information is selected for use in compensating the wavefront curvature.

In addition, the "manner allowing the optical property information to be modified" set forth in the above mode (15) may be implemented in an alternative arrangement in which, each time that the optical systems are exchanged, the content of the "storage portion" set forth in the above mode (15) is updated to reflect a corresponding one of a plurality of sets of optical property information each defining a relationship between the possible entrance positions of the light beam on the optical systems, and the possible amounts of change in wavefront curvature due to the optical systems.

In this arrangement, the updating in content of the storage portion may be achieved for example by replacing the currently-available recording medium for use in the storage portion with a separate recording medium storing therein a separate content.

(16) The apparatus according to any one of modes (1)–(15), wherein the scanner scans the light beam emitted by the light emitter in primary and secondary scanning directions, and wherein an amount of change in wavefront curvature of the light beam occurring when the light beam travels via the optical system is varied less with movement of an entrance position at which the incoming light beam enters the optical system, in the primary scanning direction, than with movement of the entrance position in the secondary scanning direction.

In general, for displaying one picture of an image, a primary scan is performed repeatedly for a plurality of lines, while a secondary scan is performed only once.

On the other hand, the apparatus according to any one of the preceding modes (1)–(15) may be practiced in an arrangement in which the optical system has its surface which the light beam enters and which extends in two intersecting directions. In this arrangement, the amount of change in wavefront curvature of the light beam due to the optical system is varied with movement of the entrance position at which the incoming light beam enters the optical system. Further, in this arrangement, such variations in amount of change are different in amount between when moving in one of the two intersecting directions and when moving in the other intersecting direction.

Yet further, in this arrangement, once one of these two intersecting directions smaller in amount of change is selected as the direction of the primary scan, which has its higher scanning frequency, this results in an easier reduction in speed of response of the wavefront curvature to the issue of a command for modifying or compensating the wavefront curvature.

Based on the above findings, the apparatus according to the above mode (16) is configured such that the amount of change in wavefront curvature of the light beam due to the optical system is varied less with movement of the entrance position in the primary scanning direction, than with movement of the entrance position in the secondary scanning direction.

(17) The apparatus according to any one of modes (1)–(16), wherein the light emitter comprises a plurality of light emitting devices emitting a plurality of components of the light beam different in wavelength, respectively, wherein the apparatus further comprising a combiner combining the plurality of components emitted by the plurality of light emitting devices, respectively, into a combined light beam, and emitting the combined light beam to the scanner, and wherein the curvature compensator compensates wavefront curvatures of the plurality of components emitted by the plurality of light emitting devices, respectively, on a per component basis.

The apparatus according to the above mode (17) produces a light beam having a desired color by combining a plurality of light beams different in wavelength.

Although the above apparatus, before the plurality of light beams are combined, modifies the wavefront curvature of each light beam, such a construction may be considered that, after the plurality of light beams are combined into a single light beam, a wavefront curvature modulator modifies the wavefront curvature of the combined light beam.

However, when the above construction is adapted, the components of the combined light beam are unwantedly changed in wavefront curvature, at the time that these components pass through the above wavefront curvature modulator and other optics (lenses, for example), by the respective different amounts reflecting the differences in wavelength between these components.

Under this situation, for the wavefront curvature of each component of the combined light beam to resultantly have a corresponding desired value, it is required to compensate, before the creation of the combined light beam, the wavefront curvatures of the plurality of original light beams on a per wavelength basis. To accomplish this, there is required at least one additional wavefront curvature modulator capable of compensate, before the creation of the combined light beam, the wavefront curvatures of the plurality of original light beams on a per wavelength basis.

In this regard, the apparatus according to the above mode (17) adapts the construction in which a plurality of original light beams different in wavelength are modulated, before combined, independently of each other. This allows the beam-by-beam compensation of wavefront curvatures of the plurality of original light beams before combined, without requiring the compensation of the wavefront curvature after the plurality of original light beams are combined.

(18) An apparatus for use in image display, of projecting a light beam onto a retina of a viewer, to thereby allow the viewer to perceive an image, the apparatus comprising:

a light emitter emitting a light beam, the light emitter including:

a light emitting device emitting the light beam; and a curvature modulator modulating a wavefront curvature of the light beam emitted by the light emitting device;

a scanner scanning the light beam emitted by the light emitter;

an optical system receiving the light beam scanned by the scanner as an incoming light beam, and emitting the received incoming light beam as an outgoing light beam, such that, upon modulation of the light beam with respect to a traveling direction of the light beam, the outgoing light beam is directed to a pupil of the viewer;

a storage storing optical property information defining a relationship between an entrance position at which the incoming light beam enters the optical system, and an amount of change in wavefront curvature of the light beam occurring when the light beam travels via the optical system; and a curvature compensator compensating a wavefront curvature of the incoming light beam, to achieve a desired value of a wavefront curvature of the outgoing light beam advancing toward the pupil of the viewer, based on the optical property information stored in the storage, using the curvature modulator.

The apparatus according to the above mode (18), despite of the fact that the amount or degree of change in wavefront curvature of the light beam due to the optical system is varied with changes in entrance position at which the incoming light beam enters the optical system, allows the compensation of the wavefront curvature of the incoming light beam entering the optical system, to achieve a desired value of wavefront curvature of the outgoing light beam directed to the retina of the viewer.

Therefore, the apparatus according to the above mode (18), despite of the fact that the amount or degree of change in wavefront curvature of the light beam due to the optical system is varied with changes in entrance position at which the incoming light beam enters the optical system, facilitates the viewer's accurate perception of an image.

Further, the apparatus according to the above mode (18) modulates the wavefront curvature of the light beam emitted from the light emitter thereby compensating the wavefront curvature.

(19) An image display apparatus comprising:

a light beam output device outputting a light beam with a variable wavefront curvature;

a scanning device scanning the light beam outputted by the light beam output device; and optics which the light beam scanned by the scanning device enters and which changes a traveling direction of the light beam to direct the light beam to a pupil of a viewer, the apparatus is characterized by comprising:

a storage device storing optical property information indicating a relationship between an entrance position at which the light beam enters the optics and an amount of change in wavefront curvature of the light beam due to the optics; and a curvature compensator modifying the wavefront curvature of the light beam outputted by the light beam output device, to achieve a desired value of the wavefront curvature of the light beam which attempts to enter the pupil of the viewer, based on the optical property information stored in the storage device.

The apparatus according to the above mode (19) allows the provision of the functions and effects common to those of the apparatus according to the above mode (1).

(20) The apparatus according to mode (19), further comprising a detector detecting environmental information affecting the amount of change in wavefront curvature of the light beam due to the optics, wherein the storage device stores therein a plurality of sets of optical property information varied with the environmental information, and wherein the curvature compensator uses one of the plurality of sets of optical property information stored in the storage device which corresponds to the environmental information detected by the detector.

(21) The apparatus according to mode (19) or (20), wherein the optics is replaceable with a plurality of kinds of candidate optics different in amount of change in wavefront curvature of the light beam, and wherein the storage device is configured such that the optical property information used in the curvature compensator is updatable to information in conformity with the kind of the currently-available optics.

(22) The apparatus according to any one of modes (19)–(21), wherein the scanning device is configured so as to scan the light beam outputted by the light beam output device in a primary and secondary scanning directions, and wherein the primary scanning direction is set to a direction smaller in variations of the amount of change in wavefront curvature of the light beam due to the optics, with movement of the entrance position at which the light beam enters the optics, while the secondary scanning direction is set to a direction larger in variations of the amount of change with movement of the entrance position.

(23) The apparatus according to any one of modes (19)–(22), wherein the light beam output device comprises a plurality of beam output portions, wherein the apparatus further comprises a combiner combining a plurality of light beams outputted by the plurality of beam output portions, respectively, and outputting the combined light beam, wherein the plurality of beam output portions output the plurality of light beams different in wavelength, respectively, and wherein the curvature compensator modifies a wavefront curvature of the light beam outputted by each one of the plurality of beam output portions, based on the optical property information stored in the storage device.

Several presently preferred embodiments of the invention will be described in more detail by reference to the drawings in which like numerals are used to indicate like elements throughout.

FIG. 1 shows a schematic configuration of a retinal scanning display 10 as an image forming apparatus in accordance with a first embodiment of the present invention.

The retinal scanning display 10 is for use in causing laser light in the form of a light beam to enter a pupil 2 of a viewer's eye, to thereby allow the viewer to perceive an image projected onto a retina of the viewer's eye. The retinal scanning display 10, as shown in FIG. 1, includes an R laser emitter 12, a G laser emitter 14, and a B laser emitter 16, each of which emits laser light of a corresponding one of red (R), green (G), and blue (B) (having the respective different wavelength bands), and each of which is capable of modulating the output intensity and the wavefront curvature of the corresponding laser light emitted.

As shown in FIG. 1, the retinal scanning display 10 further includes a total reflection mirror 18 and partially-transmissible mirrors 20, 22, both utilized for combining the laser light of three colors emitted from the respective laser emitters 12, 14, and 16.

The total reflection mirror 18 causes the laser light emitted from the R laser emitter 12 to be reflected off the total reflection mirror 18.

The partially-transmissive mirror 20 allows the laser light emitted from the total reflection mirror 18 to pass through the partially-transmissive mirror 20, and causes the laser light emitted from the G laser emitter 14 to be reflect off the partially-transmissible mirror 20 in a direction common in optical axis to the laser light which has passed through the total reflection mirror 18.

The partially-transmissive mirror 22 allows the laser light emitted from the partially-transmissible mirror 20 to pass through the partially-transmissive mirror 22, and causes the laser light emitted from the B laser emitter 16 to be reflected off the partially-transmissible mirror 22 in a direction common in optical axis to the laser light which has passed through the partially-transmissible mirror 20.

As shown in FIG. 1, the retinal scanning display 10 still further includes a scanning mirror 24 scanning in a two-dimensional direction the laser light combined by the above-mentioned three mirrors 18, 20, and 22; and a projection mirror 26 causing the laser light scanned by the scanning mirror 24 to be reflected off the projection mirror 26 and causing the reflected laser light to be projected onto the pupil 2 of the viewer's eye.

As shown in FIG. 1, the retinal scanning display 10 yet further includes a storage 28 storing a variety of sets of information, and a controller 30 which controls the intensity and the wavefront curvature of the laser light emitted from each of the laser emitters 12, 14, and 16, and which controls the scanning mirror 24 to scan the laser light. The scanning mirror 24, in the form of an angularly oscillating mirror oscillated by a driver 241 in the two-dimensional direction (a combination of a primary and a secondary scanning direction), is controlled via the driver 241 by the direction of the controller 30 for a scanning operation.

Then, a more specific configuration of the laser emitters 12, 14, and 16 will be described. However, only the R laser emitter 12 will be representatively described, and the descriptions of the other laser emitters 14 and 16 will be omitted in view of the fact that these are common in construction to the R laser emitter 12.

Figure 2:
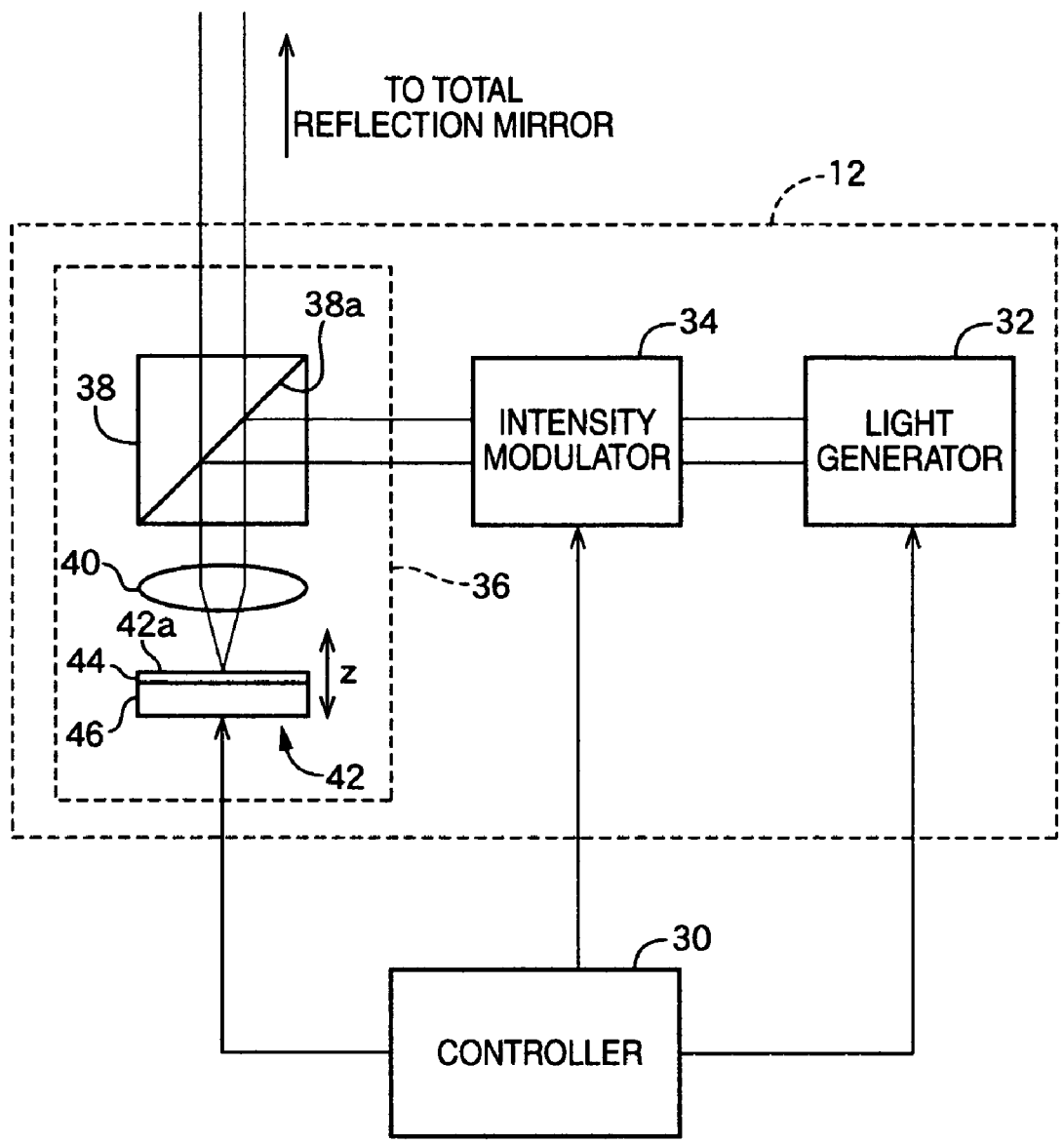
FIG. 2 schematically illustrates the construction of an R laser emitter illustrated in FIG. 1.

As shown in FIG. 2, the R laser emitter 12 includes a light generator (an example of a light emitter) 32 generating red-colored laser light (parallel light) according to commands issued from the controller 30; an intensity modulator 34 modulating the intensity of laser light which has left the light generator 32, depending on a value instructed by the controller 30; and a wavefront curvature modulator 36 modulating the wavefront curvature of laser light which has passed through the intensity modulator 34. An example of the light generator 32 is constructed to include a semiconductor laser device as a light source. An example of the intensity modulator 34 is an AOM (Acousto Optic Modulator) as a modulator modulating the intensity of light.

The wavefront curvature modulator 36 includes a semi-transparent mirror 38 which laser light enters from the intensity modulator 34; a convex lens (an example of a light converging portion) 40 causing the laser light from the semi-transparent mirror 38 to converge with its focal length "f"; and a movable mirror 42.

The movable mirror 42 has a reflective surface 42a causing the incident laser light thereon from the convex lens 40 to be reflected back to the semi-transparent mirror 38. Relative movement of the reflective surface 42a to the convex lens 40 enables adjustment in length of an optical path therebetween.

As shown in FIG. 2, the semi-transparent mirror 38 is rectangular in shape with two right-angle prisms attached to each other at their inclined surfaces 38a, 38a, each of which is coated with a dielectric multiple layer film. Each of the right-angle prisms causes approximately 50% of the amount of the incident laser light to be reflected off the corresponding inclined surface 38a at a right angle to the incident laser light, and allows approximately 50% of the amount of the incident laser light to pass through the corresponding inclined surface 38a.

Therefore, once the laser light from the intensity modulator 34 is incident on the semi-transparent mirror 38, approximately 50% of the amount of the incident laser light is reflected off the inclined surface 38a, and in turn enters the convex lens 40 disposed on a light emitting side of the semi-transparent mirror 38.

Upon exit from the convex lens 40 and reflection off from the reflective surface 42a of the movable mirror 42, the laser light re-enters the semi-transparent mirror 38 through the convex lens 40. The semi-transparent mirror 38 causes approximately 50% of the amount of the incident laser light to pass through the inclined surfaces 38a, resulting in the generation of output light emitted from the R laser emitter 12.

As shown in FIG. 2, the movable mirror 42 is constructed by together attaching a reflective plate 44 and a piezoelectric actuator 46 having multiple layers of piezoelectric elements. The reflective plate 44 is formed by applying a mirror coating with a metal film to the surface of a light-transmissible plate such as a glass plate. The piezoelectric actuator 46 is driven, due to application of a drive voltage thereto by the controller 30, so as to move the reflective plate 44 in a direction normal to the reflective surface 42a (denoted by the arrow z in FIG. 2), depending on the magnitude of the applied drive voltage, thereby adjusting the optical-path length between the reflective surface 42a and the convex lens 40.

Then, the control of the optical-path length will be described by referring to FIGS. 3(a) and 3(b).

Figure 3:
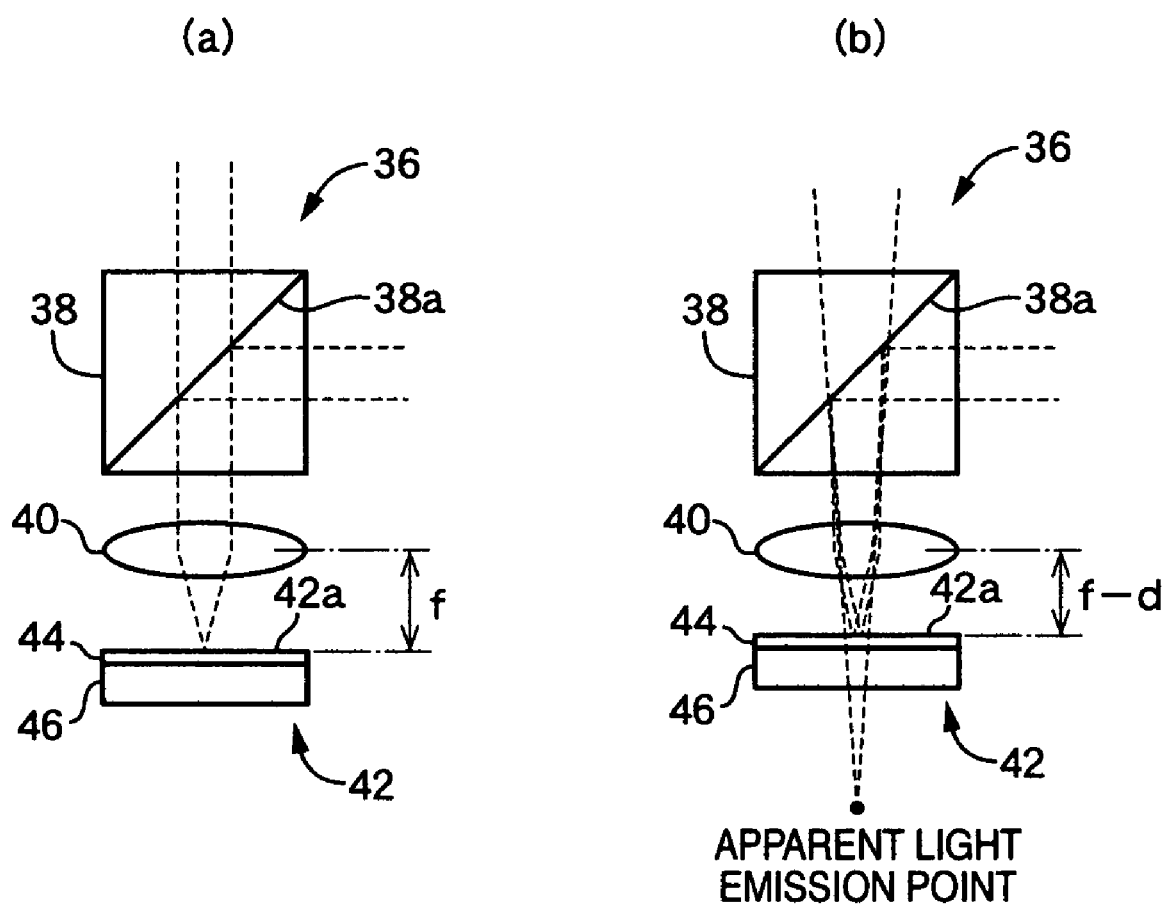
FIG. 3 is an optical path diagram for explaining the operation of a wavefront curvature modulator of the R laser emitter illustrated in FIG. 2.

As shown in FIG. 3(a), an optical-path length, which is defined to mean the distance between the reflective surface 42a and the principal point of the convex lens 40, is preset to the focal length "f" of the convex lens 40, in an optical layout in which the controller 30 applies no drive voltage to the piezoelectric actuator 46.

Therefore, upon entry into the convex lens 40 from the semi-transparent mirror 38 in the above optical layout, laser light (original parallel light) is caused to converge due to refraction while passing through the convex lens 40, resulting in the laser light being focused on the reflective surface 42a. The thus-converging laser light is reflected back in a direction common in optical axis to the incident laser light, resulting in the transformation of the converging light into diverging light which diverges so as to form the same angle as when the converging light converges.

In the above optical layout, upon re-entry into the convex lens 40, the diverging light is transformed into the resulting parallel light as a result of the refraction of the diverging light by the convex lens 40 at same angle as when the original parallel light converged. That is to say, the convex lens 40 functions to collimate the incident laser light thereon.

On the other hand, as shown in FIG. 3(b), upon reception of a drive voltage from the controller 30, the piezoelectric actuator 46 is driven to move the reflective surface 42a toward the convex lens 40. As a result, the optical-path length between the reflective surface 42a and the principal point of the convex lens 40 is changed from "f" to "f–d," where "d" represents the moving distance of the reflective surface 42a measured from the focal point located the focal length "f" apart from the principal point of the convex lens 40.

Therefore, upon entry into the convex lens 40 from the semi-transparent mirror 38 in the above optical layout, laser light is converged due to refraction while passing through the convex lens 40, in a similar manner as the previous optical layout as shown in FIG. 3(a). However, in the current optical layout as shown in FIG. 3(b), the displacement of the reflective surface 42a from the focal point toward the convex lens 40 prevents the converging laser light to be focused on the reflective surface 42a.

In this optical layout as shown in FIG. 3(b), the laser light, upon being reflected off the reflective surface 42a, is focused at the position the distance "d" forward from the reflective surface 42a, i.e., at the position spaced the distance "f–2d" apart from the principal point of the convex lens 40, resulting in the transformation of the converging laser light into diverging laser light re-entering the convex lens 40.

Therefore, in this optical layout, the laser light, although its diverging angle is reduced due to refraction while passing through the convex lens 40, passes through the convex lens 40 without transformation into parallel light, in other words, without collimation of the laser light. This results in a change in wavefront curvature of the laser light. In this context, the phrase "a change in wavefront curvature of the laser light" means, more exactly, a change in wavefront curvature of the laser light at a given position (at the retina of the viewer, for example).

Then, the reasons why the retinal scanning display 10 modulates the wavefront curvature of the laser light by means of each laser emitter 12, 14, 16 will be described briefly.

In general, upon emission from a light source, light propagates in the form of a light wave traveling from the light emission point in all directions identically in speed and phase, i.e., what is called a spherical wave. When the spherical wave is projected onto the retina of the viewer with the radius of curvature being variable with the distance between the light emission point and the viewer, the viewer perceives the depth depending on the radius of curvature.

With this in mind, the present embodiment is configured, such that the wavefront curvature of the laser light which is eventually incident on the pupil 2 of the viewer is modulated thereby changing in position an apparent light emission point of the laser light (see FIG. 3(b)), allowing the viewer to perceive the depth of the projected image in a more natural manner.

More specifically, when the wavefront curvature modulator 36 in the present embodiment is practiced, for example, with the focal length "f" of the convex lens 40 being equal to 4 mm, the movement of the reflective surface 42a of the movable mirror 42 in the range of approximately 30 μm allows the viewer to perceive the depth in the range between the nearest position approximately 30 cm apart from the viewer and the optical infinity.

Alternatively, when the wavefront curvature modulator 36 in the present embodiment is practiced, with the focal length "f" of the convex lens 40 being equal to 2 mm, the movement of the reflective surface 42a of the movable mirror 42 in the range of approximately 10 μm allows the viewer to perceive the depth in the range between the nearest position approximately 30 cm apart from the viewer and the optical infinity.

Figure 4:
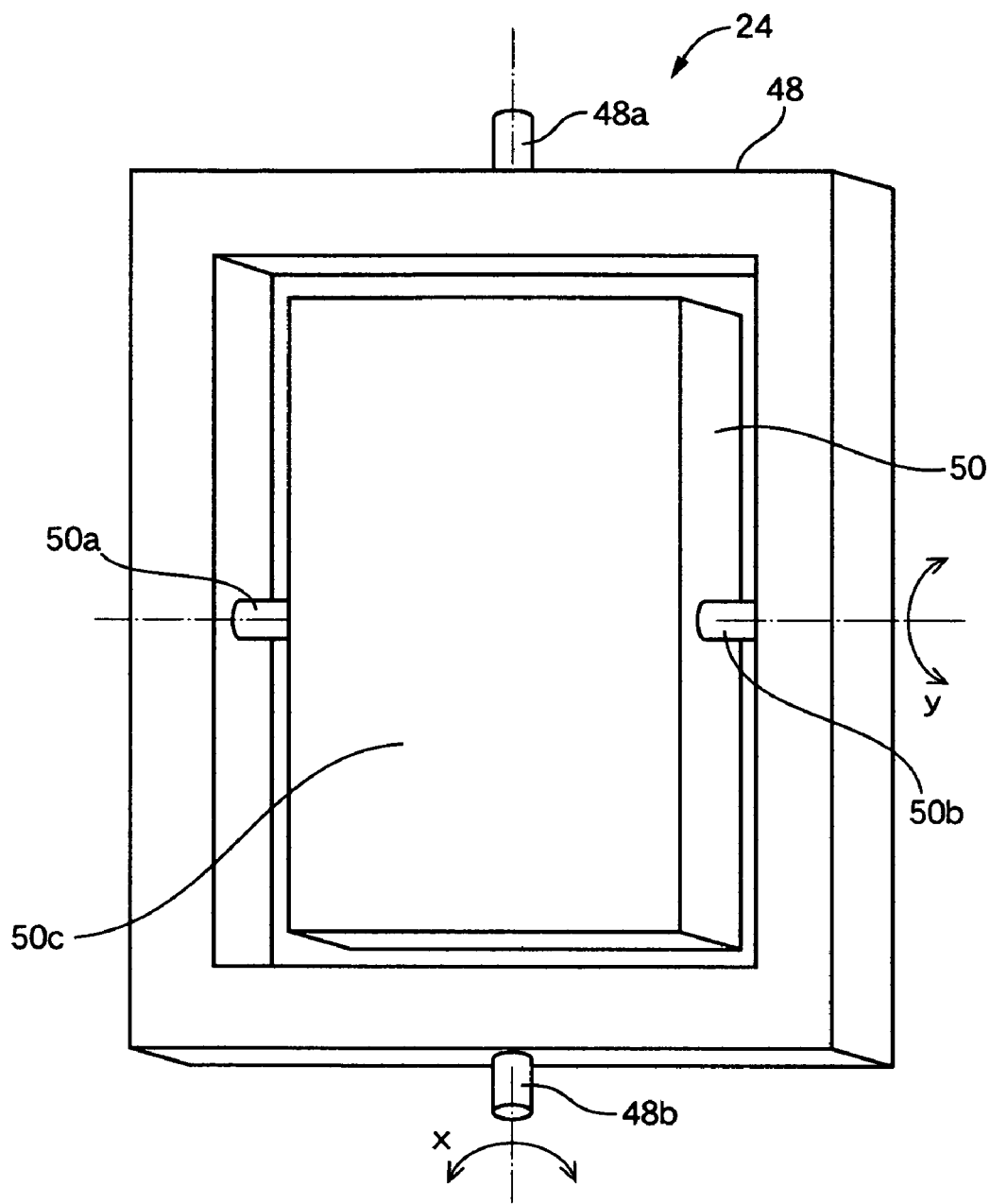
FIG. 4 is a perspective view illustrating the exterior of a scanning mirror illustrated in FIG. 1.

As shown in FIG. 4, the scanning mirror 24 includes a frame 48 having two coaxial shaft portions 48a, 48b pivotably supported by a supporting member (not shown). The scanning mirror 24 further includes a scanning plate 50 having two coaxial shaft portions 50a, 50b pivotably supported by the frame 48. That is to say, the scanning plate 50 is supported by the supporting member (not shown) so as to oscillate angularly about two orthogonal axes of the shaft portions 48a, 48b and the shaft portions 50a, 50b, respectively.

The scanning plate 50 has a reflective surface 50c causing the laser light combined by both the total reflection mirror 18 and the partially-transmissible mirrors 20, 22, both of which are shown in FIG. 1, to be reflected off the reflecting surface 50c toward the projection mirror 26.

The scanning mirror 24 is driven by the driver 241 shown in FIG. 1. An example of the driver 241 may be of a magnetic type. For this magnetic type, the driver 241 may be constructed with a movable member of the driver 241 provided with a coil, and with a stationary member of the driver 241 provided with a permanent magnet, for example.

The driver 241 angularly oscillates the frame 48 and the scanning plate 50 about an x- and a y-axis, respectively, and independently of each other, based on the commands issued from the controller 30. The angular oscillations change in orientation the reflective surface 50c of the scanning plate 50, resulting in a two-dimensional scan of the laser light reflected off the reflective surface 50c.

More specifically, the present embodiment is configured such that, each time that the frame 48 oscillates once about the x-axis, the scanning plate 50 oscillates a plurality of times about the y-axis, and such that the scanning plate 50 scans the laser light in the primary scanning direction due to the oscillation about the y-axis, and due to the oscillation in the secondary scanning direction about the x-axis.

As shown in FIG. 1, the projection mirror 26, in the form of a semi-transparent mirror, has both the function of causing the laser light scanned by the scanning mirror 24 to be reflected off the projection mirror 26 into the pupil 2 of the viewer, and the function of allowing incoming light from in front of the viewer to pass through the projection mirror 26.

Figure 5:
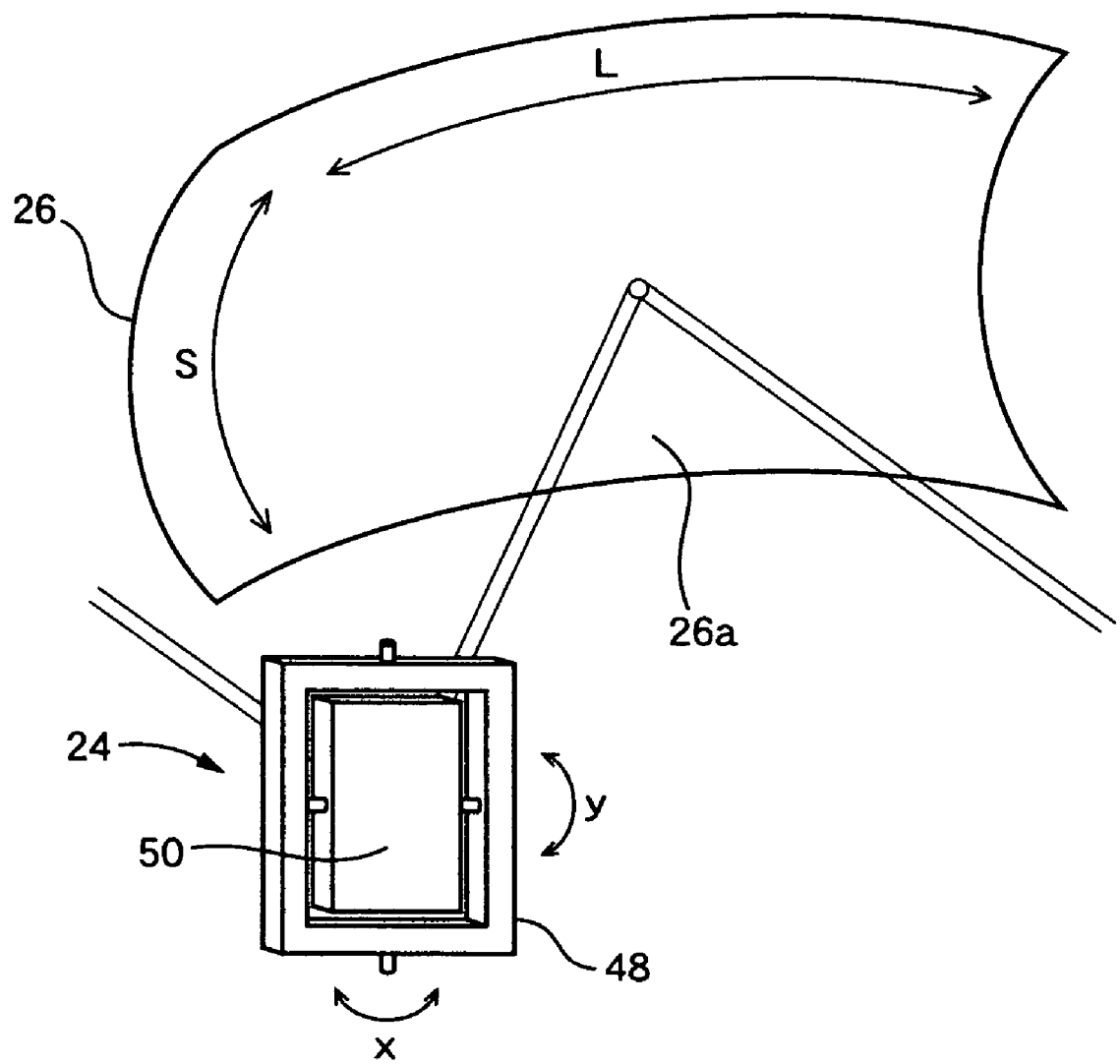
FIG. 5 is a perspective view for explaining a scanning direction of laser light in the retinal scanning display illustrated in FIG. 1.

As shown in FIG. 5, a reflective surface 26a of the projection mirror 26 for causing the laser light to be reflected off is shaped to have a concave curved surface, extending in a major axis direction of the projection mirror 26 (the direction denoted by the arrow L in FIG. 5) and a minor axis direction of the projection mirror 26 (the direction denoted by the arrow S in FIG. 5).

The curved surface is formed as a portion of an ellipsoidal surface of revolution. The projection mirror 26 in use is mounted on the head of the viewer in front of the viewer's eye, in a manner that a reflection point at which the laser light is reflected off the reflective surface 50c of the scanning mirror 24 is coincident in position with one of two foci of the ellipsoidal surface of the revolution, and that the pupil 2 of the viewer is coincident in position with the other focus of the ellipsoidal surface of revolution.

With the projection mirror 26 being mounted on the viewer, the laser light scanned by the scanning mirror 24 enters the pupil 2 of the viewer and is in turn focused on the retina with certainty.

As described above, the reflective surface 26a of the projection mirror 26, although is a curved surface, is not a spherical surface, and therefore, the reflective surface 26a is not constant in curvature throughout the reflective surface 26a, and is varied in curvature as a position changes thereon. More specifically, as shown in FIG. 5, the reflective surface 26a is formed as a portion of an ellipse in a cross section taken parallel to the major axis direction of the projection mirror 26, while is formed as a portion of a true circle in a cross section taken parallel to the minor axis direction of the projection mirror 26.

For this reason, there is large the amount of change in curvature of the reflective surface 26a occurring when moving in the major axis direction, while there is small the amount of change in curvature of the reflective surface 26a occurring when moving in the minor axis direction.

On the other hand, because the curvature of the reflective surface 26a changes with changes in position thereon, the amount of change in wavefront curvature of the laser light between before and after the reflection by the reflective surface 26a is changed with changes in position thereon, as well.

Based on the above findings, the retinal scanning display 10 is configured, such that the scanning mirror 24 scans the laser light, under the setting that the minor axis direction of the projection mirror 26 (the direction denoted by the arrow S in FIG. 5) is selected as the primary scanning direction, while the major axis direction of the projection mirror 26 (the direction denoted by the arrow L in FIG. 5) is selected as the secondary scanning direction.

In the present embodiment, the wavefront curvature of the laser light is changed between before and after its reflection by the reflective surface 26a, and the amount of change in wavefront curvature of the laser light is changed with movement of the reflection point of the laser light on the reflective surface 26a (an entrance position at which the laser light enters the reflective surface 26a). However, the present embodiment allows the frequency of a cyclic event that the wavefront curvature is changed to become low when compared with the case where the major axis direction of the projection mirror 26 is selected as the primary scanning direction, while the minor axis direction of the projection mirror 26 is selected as the secondary scanning direction.

As shown in FIG. 1, the controller 30, upon input of an image signal (a video signal) from an external device (not shown) such as a computer, performs the control for allowing the viewer to perceive the image represented by the image signal.

More specifically, the controller 30 causes the light generator 32 of each laser emitters 12, 14, 16 to output the laser light, based on the image signal, and causes the intensity modulator 34 to modulate the intensity of the output laser light so as to reproduce the colors of the image represented by the image signal. The controller 30 further causes the wavefront curvature modulator 36 to modulate the wavefront curvature of the laser light so as to reproduce the depth of the image represented by the image signal. The controller 30 still further drives the scanning mirror 24 to thereby two-dimensionally scan the laser light.

The laser lights which have been thus outputted from the laser emitters 12, 14, and 16, respectively, are combined by the total reflection mirror 18 and the partially-transmissible mirrors 20, 22. The combined laser light is then scanned two-dimensionally by the scanning mirror 24, is reflected off by the projection mirror 26, and in turn enters the pupil 2 of the viewer. As a result, the image represented by the image signal is projected onto the retina of the viewer, thereby allowing the viewer to perceive the image.

In order for the viewer to perceive the depth of the image represented by the image signal, the laser light outputted from each laser emitter 12, 14, 16 is required to be modulated such that the wavefront curvature of the laser light entering the pupil 2 of the viewer becomes coincident with a desired value corresponding to the depth.

However, the wavefront curvature of the laser light is unwantedly changed, at the time that the laser light is reflected off the reflective surface 26a of the projection mirror 26, by the amount of change varied with changes in reflection point of the laser light on the reflective surface 26a, and therefore a mere modulation of the wavefront curvature of the laser light outputted from each laser emitter 12, 14, 16 based on only the depth of the image represented by the image signal fails to adjust the wavefront curvature of the laser light entering the pupil 2 of the viewer, to the desired value.

With this in mind, the present embodiment is configured such that, prior to entry into the projection mirror 26, the laser light outputted from each laser emitter 12, 14, 16 is previously compensated by the controller 30 in wavefront curvature, by allowing for the subsequent change in wavefront curvature occurring when the laser light is reflected off the reflective surface 26a of the projection mirror 26.

There will be described below the modulation in wavefront curvature of the laser light outputted from each laser emitter 12, 14, 16. However, only the wavefront curvature modulation by the R laser emitter 12 will be representatively described, by omitting the description of the wavefront curvature modulations by the remaining laser emitters 14, 16, in view of the fact that the they are common in operation to that of the R laser emitter 12.

Figure 6:
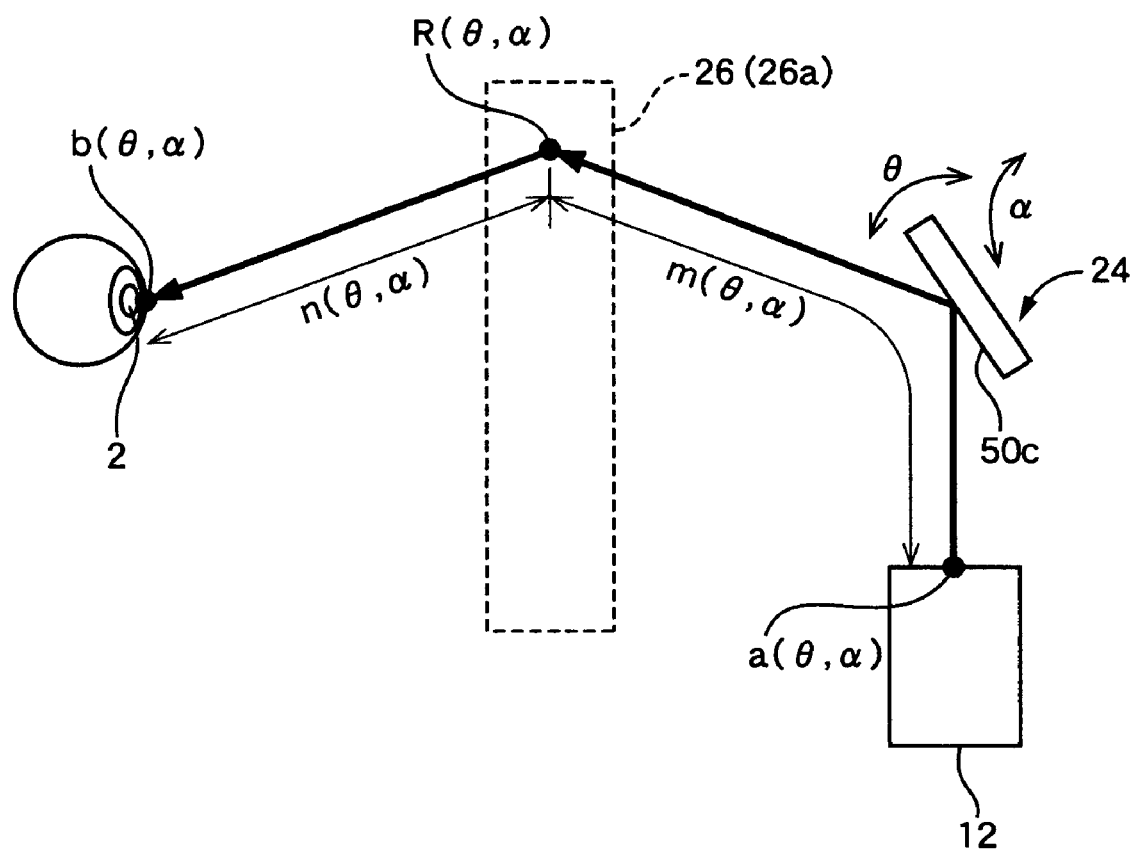
FIG. 6 is a schematic diagram illustrating the retinal scanning display illustrated in FIG. 1.

As illustrated in the schematic diagram of FIG. 6, the laser light, upon exit from the R laser emitter 12, is scanned by the scanning mirror 24 in the primary and secondary scanning directions, and then, after reflection by the reflective surface 26a of the projection mirror 26, enters the pupil 2 of the viewer.

Various symbols are defined as follows:

a: wavefront curvature radius, i.e., radius of wavefront curvature of laser light emitted from R laser emitter 12,
θ: angle of reflective surface 50c of scanning mirror 24 during angular displacement in primary scanning direction,
α: angle of reflective surface 50c of scanning mirror 24 during angular displacement in secondary scanning direction,
m: traveling distance of laser light from R laser emitter 12 to reflective surface 26a of projection mirror 26,
R: reflective surface curvature, i.e., curvature of curved surface at entrance position that laser light enters reflective surface 26a of projection mirror 26,
n: traveling distance of laser light from reflective surface 26a of projection mirror 26 to pupil 2 of viewer, and
b: wavefront curvature radius, i.e., radius of wavefront curvature of laser light at pupil 2 of viewer.

In this context, the traveling distances "m" and "n" and the reflective surface curvature "R," because of their variabilities with the angles θ and α of the reflective surface 50c of the scanning mirror 24, are denoted as a function m(θ, α), a function n(θ, α), and a function R(θ, α), respectively, each of which represents a function of the angles θ and α.

Further, the wavefront curvature radius "b," because of its correspondence to the depth of the image perceived by the viewer, is denoted as a function b(θ, α), which represents a function of the angles θ and α, as well.

It is added that, in the present embodiment, an image is displayed to the viewer two-dimensionally, and therefore the individual values (e.g., pixel-wise values) of the wavefront curvature radius "b" of the image are determined so that all the pixels of the image share the same value of the depth. Alternatively, when the present invention is practiced in a mode that an image is displayed to the viewer three-dimensionally, the individual values of the wavefront curvature radius "b" of the image are determined so that not all the pixels of the image share the same value of the depth.

Further, in the present embodiment, the wavefront curvature radius "a," since is designated to be adjusted for achieving a desired value of the corresponding wavefront curvature radius "b," is denoted as a function a(θ, α), which represents a function of the angles θ and α, as well.

Then, the value which the wavefront curvature radius "b" takes with the angles θ and α both being constant, is approximately expressed by the following equation (1):

$$b = R(a+m)/(R-2(a+m)) + n \qquad (1).$$

Accordingly, if the traveling distances "m" and "n" and the reflective surface curvature "b" are each established, then the wavefront curvature radius "a" is derived from the following equation (2):

$$a = R(b-n)/(R+2(b-n)) - m \qquad (2).$$

Figure 7:
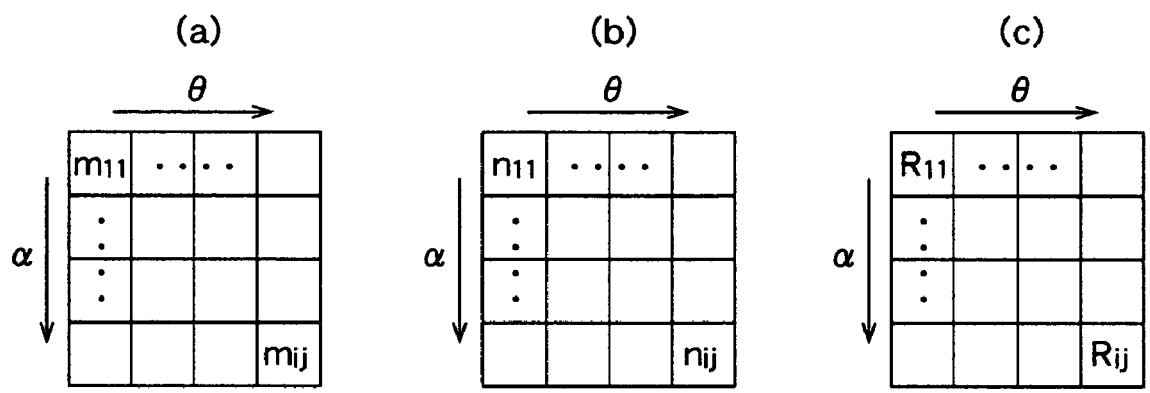
FIGS. 7(a), (b), and (c) are views schematically illustrating the contents of three look-up tables illustrated in FIG. 1, respectively.

In the storage device 28 illustrated in FIG. 1, the individual values (e.g., pixel-wise values) of the traveling distance "m," the individual values (e.g., pixel-wise values) of the traveling distance "n," and the individual values (e.g., pixel-wise values) of the reflective surface curvature "R" have been previously stored as sets of optical property information unique to the retinal scanning display 10, respectively, in association with each of a plurality of pixels forming an image represented by the aforementioned image signal, as schematically illustrated in FIGS. 7(a), 7(b), and 7(c), respectively.

Each of the individual values of the reflective surface curvature "R" unambiguously represents the amount of change in wavefront curvature of the laser light between before and after the reflection by the reflective surface 26a. The position of each pixel is defined using a pair of the angles θ and α.

More specifically, as schematically illustrated in FIG. 7(a), the individual values of the traveling distance m(θ, α) have been stored in the storage device 28, for each value of the pair of the angles θ and α corresponding to each pixel, in the format of a look up table. As schematically illustrated in FIG. 7(b), the individual values of the traveling distance n(θ, α) have been stored in the storage device 28, for each value of the pair of the angles θ and α corresponding to each pixel, in the format of a look up table. As schematically illustrated in FIG. 7(c), the individual values of the reflective surface curvature R(θ, α) have been stored in the storage device 28, for each value of the pair of the angles θ and α corresponding to each pixel, in the format of a look up table.

The controller 30, through a looking up operation of these tables stored in the storage device 28, performs the curvature modulation processing for modulating the wavefront curvature of the laser light emitted from the R laser emitter 12.

As illustrated in FIG. 1, the controller 30 is constructed principally by a computer 52. The computer 52, as well known in the art, is configured to include a processor 54 and a storage 56. In the storage 56, there has previously stored a curvature modulation program executed by the processor 54 for performing the curvature modulation processing.

Figure 8:
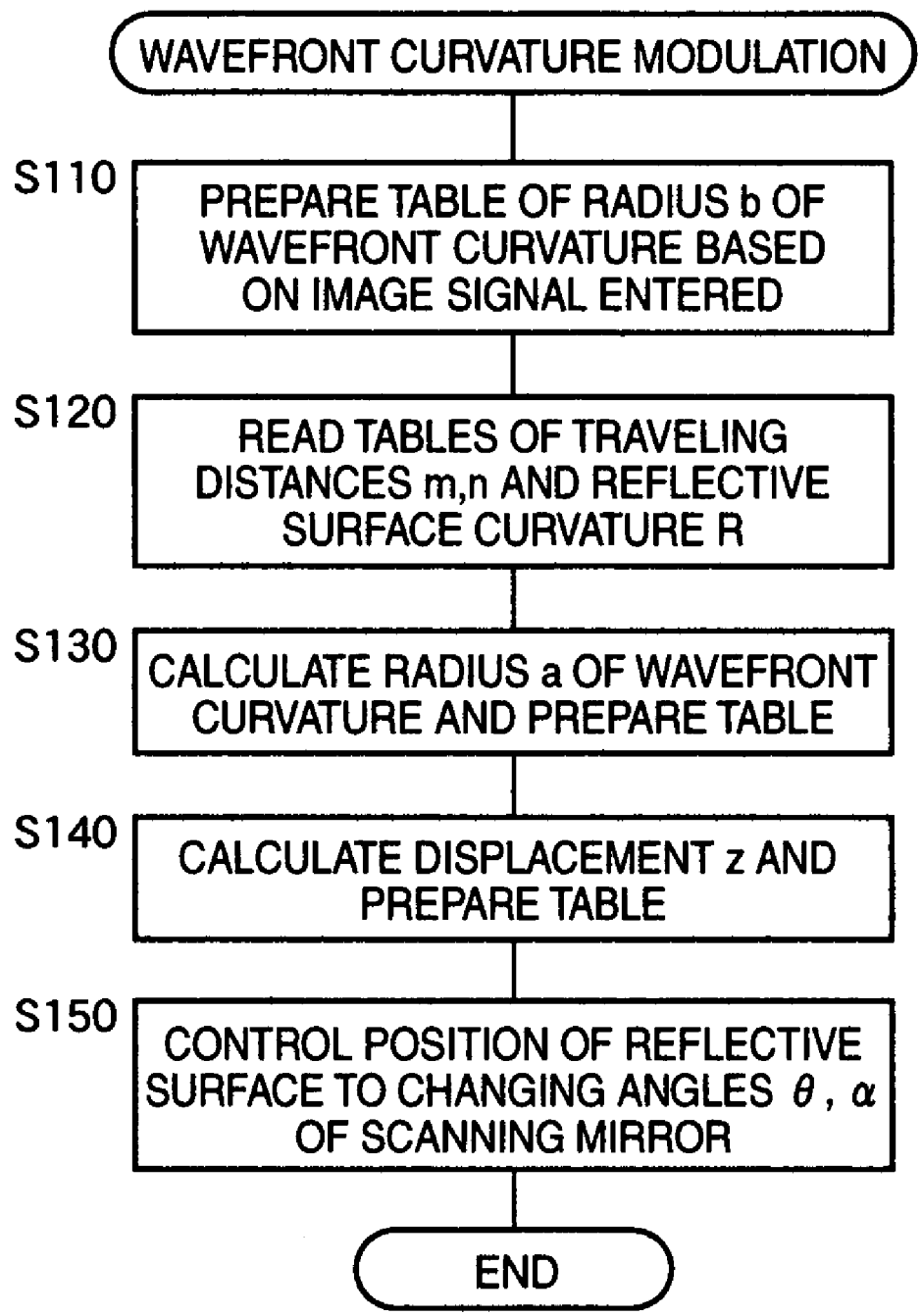
FIG. 8 is a flow chart schematically illustrating a wavefront modulation program executed by a computer of a controller illustrated in FIG. 1.

Referring next to FIG. 8, the curvature modulation program is schematically illustrated in flow chart. The controller 30 is adapted to retrieve an image signal embedding a depth signal on a per image-picture basis, and, each cycle of the retrieval of the image signal, the curvature modulation program is executed.

Once the curvature modulation program is initiated, a step S110 is first implemented to prepare a table representative of the individual values (desired values) of the wavefront curvature radius "b" for each value of the pair of the angels θ and α corresponding to each pixel of an image, based on the depth signal embedded in the retrieved image signal.

Next, a step S120 is implemented to retrieve from the storage device 28 the tables for the traveling distances "m" and "n" and the reflective surface curvature "R," respectively.

Subsequently, a step S130 is implemented to calculate, using the above equation (2), the individual values of the wavefront curvature radius "a" for each value of the pair of the angels θ and α, based on the table prepared in the step S110 for the wavefront curvature radius "b," and the tables retrieved in the step S120 for the traveling distances "m" and "n" and the reflective surface curvature "R," respectively. The step S130 is further implemented to prepare a table representative of the individual values of the wavefront curvature radius "a" for each value of the pair of the angels θ and α, based on the thus-calculated values.

Thereafter, a step S140 is implemented to calculate the individual values of a displacement "z" by which the reflective surface 42a of the movable mirror 42 is required to be displaced for achieving a desired value of the wavefront curvature radius "a", for each value of the pair of the angels θ and α, based on the table prepared in the step S130 for the wavefront curvature radius "a."

The step S140 is further implemented to prepare a table representative of the individual values of the displacement "z" for each value of the pair of the angels θ and α, based on the thus-calculated values.

Figure 9:
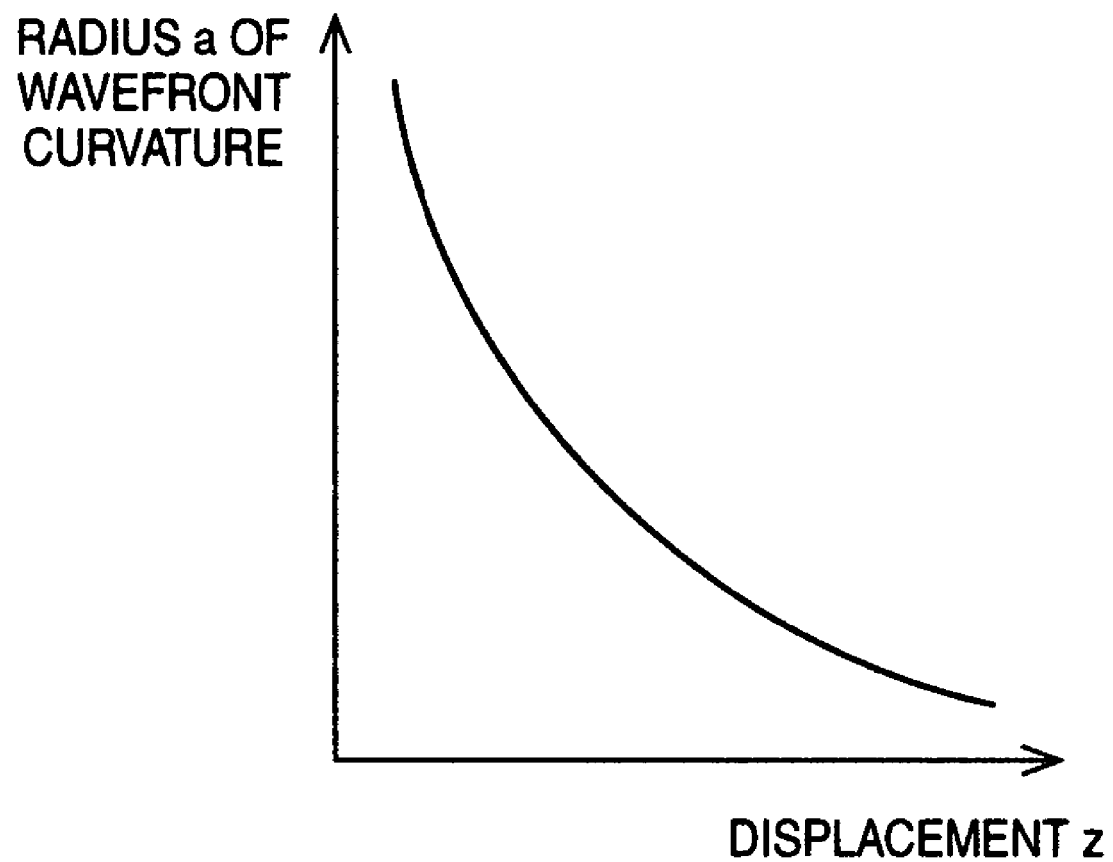
FIG. 9 is a graph for explaining a relationship between a displacement z and a radius a of the wavefront curvature in the wavefront modulation program illustrated in FIG. 8.

The displacement "z" may be calculated as follows:

The wavefront curvature radius "a" of the laser light emitted from each laser emitter 12, 14, 16, given that the focal length "f" of the convex lens 40 is fixed, is a function of the displacement "z" of the reflective surface 42a of the movable mirror 42, as expressed by the following equation (3):

$$a = g(z) \qquad (3),$$

where the g(z) represents a relationship between the displacement "z" and the wavefront curvature radius "a." The function g(z) is illustrated in FIG. 9 in graph. The function g(z) is not a function representative of a simple inverse proportion.

Accordingly, if the wavefront curvature radius "a" is established, then the displacement "z" can be derived of the following equation (4):

$$z = g^{-1}(a) \qquad (4).$$

After the step S140 is implemented to prepare the table for the displacement "z" in the above manner, the execution proceeds to a step S150 illustrated in FIG. 8.

The step S150 is implemented to control the position of the reflective surface 42a of the movable mirror 42, in response to changes in the angles θ and α (indicative of the position of a subject pixel) of the reflective surface 50c, in synchronization with the scanning operation of the laser light performed using the scanning mirror 24, and according to the table for the displacement "z."

For the measurement of the angles θ and α, it is added that each actual value of the angles θ and α of the reflective surface 50c of the scanning mirror 24 may be obtained by disposing both a detector which detects laser light at an end position of an area extending along the primary scanning direction of the reflective surface 50c, and a detector which detects laser light at an end position of an area extending along the secondary scanning direction of the reflective surface 50c, and by measuring, for each of the primary and secondary scanning directions, using a corresponding one of the detectors, a length of time elapsed since the corresponding detector detected the laser light.

Once the scanning operation of laser light and the control of the position of the reflective surface 42a of the movable mirror 42 have been completed for one full picture of an image corresponding to the retrieved image signal, one cycle of the execution of the curvature modulation program is terminated.

As is evident from the above explanation, in the present embodiment, each laser emitter 12, 14, 16 constitutes an example of the "light emitter" set forth in the above mode (1), the scanning mirror 24 constitutes an example of the "scanner" set forth in the same mode, the projection mirror 26 constitutes an example of the "optical system" set forth in the same mode, and the controller 30 constitutes an example of the "curvature compensator" set forth in the above mode (1), (2) or (3).

Further, in the present embodiment, the storage device 28 constitutes an example of the "storage" set forth in the above mode (4), the light generator 32 constitutes an example of the "light emitting device" set forth in the above mode (5), the wavefront curvature modulator 36 constitutes an example of the "curvature modulator" set forth in the same mode, and the controller 30 constitutes an example of the "curvature compensator" set forth in the same mode.

Still further, in the present embodiment, the controller 30 constitutes an example of the "controller" set forth in the above mode (6), the scanning mirror 24 constitutes an example of the "scanner" set forth in the above mode (16), the plurality of laser emitters 12, 14, 16 constitutes an example of the "plurality of light emitting devices" set forth in the above mode (17), the total reflection mirror 18 and the partially-transmissible mirrors 20, 22 together constitute an example of "combiner" set forth in the same mode, and the controller 30 constitutes an example of the "curvature compensator" set forth in the same mode.

Yet further, in the present embodiment, each laser emitter 12, 14, 16 constitutes an example of the "light emitter" set forth in the above mode (18), the scanning mirror 24 constitutes an example of the "scanner" set forth in the same mode, the projection mirror 26 constitutes an example of the "optical system" set forth in the same mode, the storage device 28 constitutes an example of the "storage" set forth in the same mode, and the controller 30 constitutes an example of the "curvature compensator" set forth in the same mode.

As will be readily understood from the above explanation, the present embodiment, despite of the fact that the amount or degree of change in wavefront curvature of laser light due to the reflection by the projection mirror 26 is varied with changes in reflection point at which the laser light is reflected off the reflective surface 26a of the projection mirror 26, makes it easier to achieve anytime a desired value of the wavefront curvature of the outgoing laser light from the projection mirror 26, i.e., the laser light entering the pupil 2 of the viewer. This facilitates the viewer's accurate perception of the image represented by an image signal.

Additionally, the present embodiment allows the wavefront curvature of the laser light emitted from each laser emitter 12, 14, 16 to be continuously changed using a corresponding one of the movable mirrors 42 provided for the respective laser emitters 12, 14, 16, resulting in an easier fine-adjustment of the wavefront curvature of the laser light entering the pupil 2 of the viewer.

Still additionally, the present embodiment is configured such that the scanning mirror 26 scans the laser light, with the minor axis direction of the projection mirror 26 being coincident with the primary scanning direction, while the major axis direction of the projection mirror 26 being coincident with the secondary scanning direction.

Therefore, the present embodiment allows a reduction in frequency at which there is varied during the scanning operation of the laser light, the amount of change in wavefront curvature of the laser light due to the reflection by the reflective surface 26a of the projection mirror 26, without requiring an increase in rate at which the wavefront curvature of the laser light emitted from each laser emitter 12, 14, 16 is modulated.

Further, in the present embodiment, the wavefront curvature modulator 36 is provided, respectively, with the laser emitters 12, 14, 16, and each laser light emitted from each laser emitter 12, 14, 16, before combined, is modulated in wavefront curvature by the corresponding wavefront curvature modulator 36.

Therefore, the present embodiment makes it inessential to employ an arrangement in which a device compensating the wavefornt curvature of the laser light beam emitted from each light generator 32 is disposed independently of and in addition to the corresponding wavefront curvature modulator 36.

For a more specific description of the above, a hypothetical example is raised in which there is employed an alternative arrangement in which the three colored laser light beams emitted from the respective laser generators 32, 32, 32, after combined, are modulated in wavefront curvature using a common wavefront-curvature modulator to these three colored laser light beams. In the hypothetical example, further, these three colored laser light beams are required, after combined, to pass through a common lens thereto.

In the above hypothetical example, there is a need for performing the color correction to minimize the chromatic aberration of these three colored laser light beams due to the reflection by the projection mirror 26. The chromatic aberration means the differences between colors in amount of change in wavefront curvature of these three colored laser light beams due to the reflection by the projection mirror 26.

To this end, it is required to dispose individual compensation devices for separately compensating in wavefront curvature the three colored laser light beams emitted from the respective laser generators 32, 32, 32, independently of and in addition to the above common wavefront curvature modulator.

In contrast, the present embodiment makes it inessential to employ the above individual compensation devices independently of and in addition to the wavefront curvature modulator 36.

It is added that, although, in the present embodiment, as described above, a plurality of look up tables have been stored in the storage device 28, each table may be replaced with a separate one.

For example, the table representative of the reflective surface curvature "R" may be replaced with a table representative of the reflecting power of the reflective surface 26a of the projection mirror 26, or a table representative of the ratio or percentage of change in wavefront curvature of the laser light due to the reflection by the reflective surface 26a.

In addition, although, in the present embodiment, each of the plurality of tables stored in the storage device 28 is formulated in terms of the angles θ and α of the reflective surface 50c of the scanning mirror 24, each table may be alternatively formulated in terms of the angle of incidence of the laser light incident on the pupil 2 of the viewer, or in terms of the reflection point at which the laser light is reflected off the reflective surface 26a of the projection mirror 26.

Moreover, the present invention may be practiced in a mode in which a table is employed which allows the calculation of the wavefront curvature radius "a" directly from both the angles θ and α of the reflective surface 50c of the scanning mirror 24 and the wavefront curvature radius "b." This mode facilitates a simplified calculation of the wavefront curvature radius "a."

Next, there will be described with reference to FIG. 10 a retinal scanning display 60 as an image display apparatus constructed according to a second embodiment of the present invention.

Figure 10:
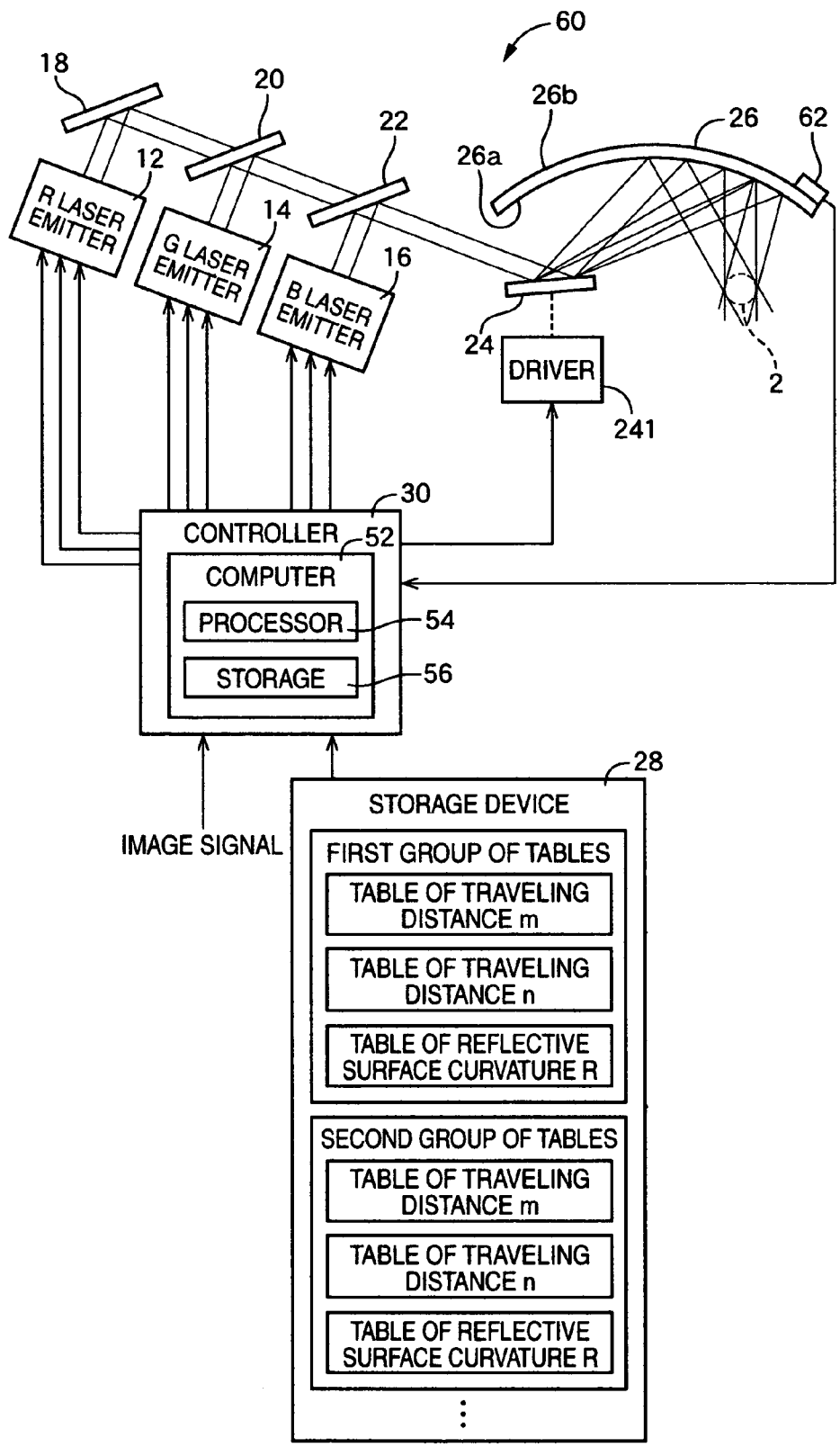
FIG. 10 schematically illustrates the construction of a retinal scanning display constructed according to a second embodiment of the present invention.

As illustrated in FIG. 10, the retinal scanning display 60 according to the present embodiment includes a temperature sensor 62 in addition to the common components to those of the retinal scanning display 10 according to the first embodiment.

Further, the retinal scanning display 60 according to the present embodiment is configured such that the storage device 28 has stored therein a plurality of table sets, each table set including a set of the tables for the traveling distances "m" and "n" and the reflective surface curvature "R," respectively.

The present embodiment will be described in greater detail below, while the common components to the retinal scanning display 10 illustrated in FIG. 1 will be omitted in the detailed description with the common components being referenced the identical reference numerals in FIG. 10.

As illustrated in FIG. 10, in the present embodiment, the temperature sensor 62 is mounted on a front face 26b (alternatively, may be the reflective surface 26a) of the projection mirror 26. The temperature sensor 62 is provided for detecting the temperature of the projection mirror 26.

As illustrated in FIG. 10, the plurality of table sets stored in the storage device 28 are provided in association with a plurality of representative temperatures of the projection mirror 26, respectively. The reflective surface 26a of the projection mirror 26 is slightly deformed due to the temperature of the projection mirror 26, resulting in variations in amount of change in wavefront curvature of laser light due to the reflection by the reflective surface 26a.

With this in mind, in the present embodiment, the plurality of table sets are provided in association with a plurality of representative values which the temperature of the projection mirror 26 possibly takes, respectively.

The controller 30 is adapted to cause the wavefront curvature modulator 36 to modulate the laser light, using one of the plurality of table sets stored in the storage device 28, which is associated with one of the plurality of representative temperatures the most approximate to the temperature detected by the temperature sensor 62.

Therefore, the present embodiment, despite of the fact that the amount of change in wavefront curvature of the laser light due to the reflection by the projection mirror 26 is varied with temperature of the projection mirror 26, modulates the wavefront curvature of the laser light emitted from each laser emitter 12, 14, 16, such that the resulting wavefront curvature of the laser light conforms with the actual optical properties of the projection mirror 26, and accurately coincides with a desired value.

As a result, the present embodiment provides, in addition to the effects common to those provided by the retinal scanning display 10 according to the first embodiment, the effect that the present embodiment allows the viewer to accurately perceive an image represented by an image signal, every time of viewing, regardless of the level of the temperature of the projection mirror 26.

As is evident from the above explanation, in the present embodiment, the temperature of the projection mirror 26 corresponds to an example of the "physical quantity" set forth in the above mode (9), (10) or (11), the temperature sensor 62 constitutes an example of the "detector" set forth in the above mode (11) or (12), the storage device 28 constitutes an example of the "storage" set forth in the above mode (12), and the controller 30 constitutes an example of the "curvature compensator" set forth in the above mode (9), (10), (11), or (12).

It is added that, in the retinal scanning display 60 according to the present embodiment, the plurality of table sets are provided in association with the discrete temperatures of the projection mirror 26, respectively. However, there are not limited to these table sets, table sets to be looked up for performing the wavefront curvature modulation by allowing for variations in optical property of the projection mirror 26.

For example, the present invention may be practiced in a mode in which there is provided a humidity sensor which detects the humidity of air surrounding the projection mirror 26, a plurality of table sets are formulated in association with a plurality of representative values of the humidity, respectively, and, using a corresponding one of the plurality of table sets, the wavefront curvature is modulated.

It is further added that, although, in the present embodiment, the projection mirror 26 in the form of a semi-transparent mirror constitutes an example of the "optical system" set forth in the above mode (1), the present invention may be alternatively practiced in a mode that the optical system is formed as a diffractive optical device.

When the above mode is practiced, a temperature sensor which detects the temperature of a medium through which a light beam propagates may be provided in light of the fact that variations in temperature of a medium through which a light beam propagates cause variations in wavelength of the light beam, resulting in variations in wavefront curvature of the light beam leaving the diffractive optical device.

In this mode, a plurality of table sets are formulated in association with a plurality of representative values of the temperature of the medium, respectively, and, using a corresponding one of the plurality of table sets, the wavefront curvature is modulated.

Next, there will be described with reference to FIG. 11 a retinal scanning display 70 as an image display apparatus constructed according to a third embodiment of the present invention.

Figure 11:
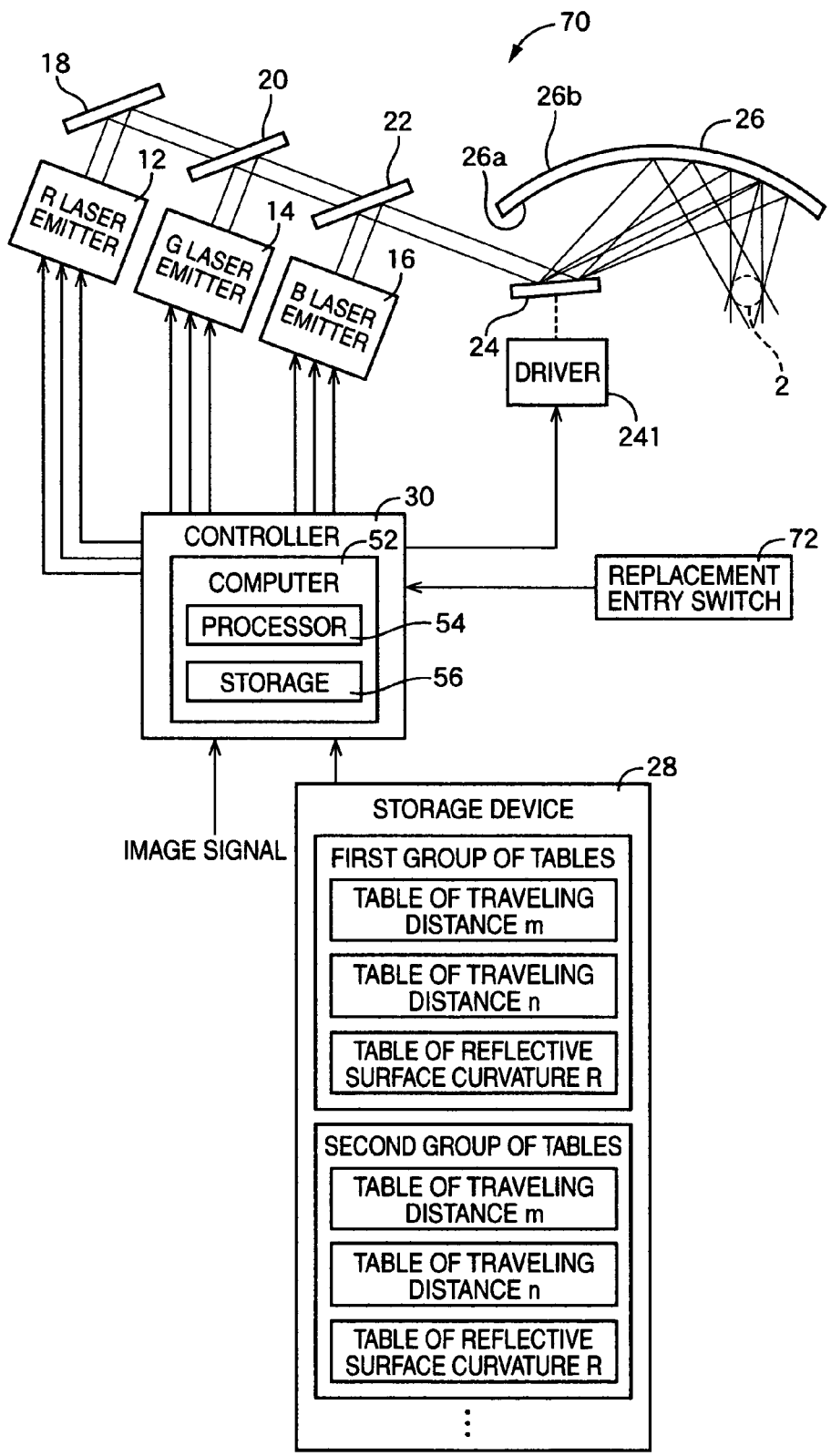
FIG. 11 schematically illustrates the construction of a retinal scanning display constructed according to a third embodiment of the present invention.

As illustrated in FIG. 11, the retinal scanning display 70 according to the present embodiment is common in fundamental construction to the retinal scanning display 10 according to the first embodiment.

However, in the present embodiment, as opposed to the first embodiment, an active projection mirror 26 is selected from a plurality of candidate projection mirrors different in kind, allowing replacement in kind of the projection mirror 26. Along with this, in the present embodiment, a replacement entry switch 72 is provided which is to be manipulated by the viewer for replacement in kind of the projection mirror 26.

Further, the retinal scanning display 70 according to the present embodiment is configured such that, similarly with the second embodiment illustrated in FIG. 10, the storage device 28 has stored therein a plurality of table sets, each table set including a set of the tables for the traveling distances "m" and "n" and the reflective surface curvature "R," respectively. These table sets are associated with the plurality of candidate projection mirrors 26, respectively.

The present embodiment will be described in greater detail below, while the common components to the retinal scanning display 10 illustrated in FIG. 1 will be omitted in the detailed description with the common components being given the identical reference numerals in FIG. 11.

In the present embodiment, the projection mirror 26 is detachably mounted on a frame (not shown) of the retinal scanning display 70, allowing the user-viewer to replace the current projection mirror 26 with a new projection mirror 26 depending on the application. Therefore, the viewer is allowed to replace the current projection mirror 26 with a new projection mirror 26 having a shape of its reflective surface 26a accomplishing a desired field of view, in the case, for example, where the viewer wishes to change the field of view of the image which is scanned on the retina by the retinal scanning display 70.

A variation in shape of the reflective surface 26a of the projection mirror 26 causes a variation in amount of change in wavefront curvature of laser light due to the projection mirror 26. With this in mind, the storage device 28 has stored therein the aforementioned plurality of table sets in association with a plurality of candidate projection mirrors 26 different in kind and replaceable with each other, respectively.

At an event of the replacement in kind of the projection mirror 26, the viewer is required to enter the event information into the controller 30. To accomplish this, in the present embodiment, the replacement entry switch 72 is provided for allowing the viewer to specify a newly-selected one of the plurality of candidate projection mirrors 26 replaceable with each other. The replacement entry switch 72 is electrically coupled with the controller 30.

The controller 30 is employed to cause the wavefront curvature modulator 36 to modulate the laser light, using one of the plurality of table sets stored in the storage device 28, which is associated with one of the plurality of candidate projection mirrors 26 which has been specified depending on the viewer's manipulating the replacement entry switch 72.

Therefore, the present embodiment, despite of the viewer's replacement in kind of the projection mirror 26, only if the viewer enters data for identifying the currently-selected projection mirror 26 via the replacement entry switch 72, modulates the wavefront curvature of the laser light emitted from each laser emitter 12, 14, 16, such that the resulting wavefront curvature of the laser light conforms with the actual optical properties of the projection mirror 26, and accurately coincides with a desired value.

As a result, the present embodiment provides, in addition to the effects common to those provided by the retinal scanning display 10 according to the first embodiment, the effect that the present embodiment allows the viewer to replace in kind the projection mirror 26 depending on the application, while ensuring the reproduction accuracy of an image.

It is added that, in the present embodiment, the plurality of table sets are provided in association with the plurality of candidate projection mirrors 26 different in kind, and one of the plurality of table sets is selected for use, depending on the viewer's manipulation of the replacement entry switch 72. However, there is not limited to this, a manner in which the controller 30 performs replacement in optical property information.

For example, the present invention may be practiced in the case where a recording medium on which the storage device 28 reads data is replaceable, in a mode in which, when the current projection mirror 26 is replaced with a new projection mirror 26, the current recording medium is replaced with a new recording medium storing optical property information of the new projection mirror 26. The mode accomplishes the same purpose as the above.

As is evident from the above explanation, in the present embodiment, the projection mirror 26 constitutes an example of the "optical system" set forth in the above mode (13), and the controller 30 constitutes an example of the "curvature compensator" set forth in the same mode or the above mode (14).

Further, in the present embodiment, the storage device 28 constitutes an example of the "storage" set forth in the above mode (15), and the controller 30 constitutes an example of the "curvature compensator" set forth in the same mode.

Next, there will be described a fourth embodiment of the present invention.

The present embodiment is different from the first to third embodiments of the present invention as described above, with respect to the construction of the laser emitters, while is common with respect to the construction of the remaining components.

In view of this fact, only the different components of the present embodiment from those of the first to third embodiments will be described in greater detail, while the common elements will be referenced the identical reference numerals, without a redundant detailed description and illustration.

In any one of the first to third embodiments, as illustrated in, for example, FIG. 2, the wavefront-curvature modulators 36 modulate in wavefront curvature the respective laser light beams on a per color-of-laser-light basis.

In contrast, in the present embodiment, a plurality of optical systems are provide for each one of the three colored laser light beams. The plurality of optical systems for each color of laser light generate a plurality of laser beams different in wavefront curvature, with each wavefront curvature being unchanged. In the present embodiment, the modulation in wavefront curvature of laser light depends on the selection from the plurality of optical systems.

Figure 12:
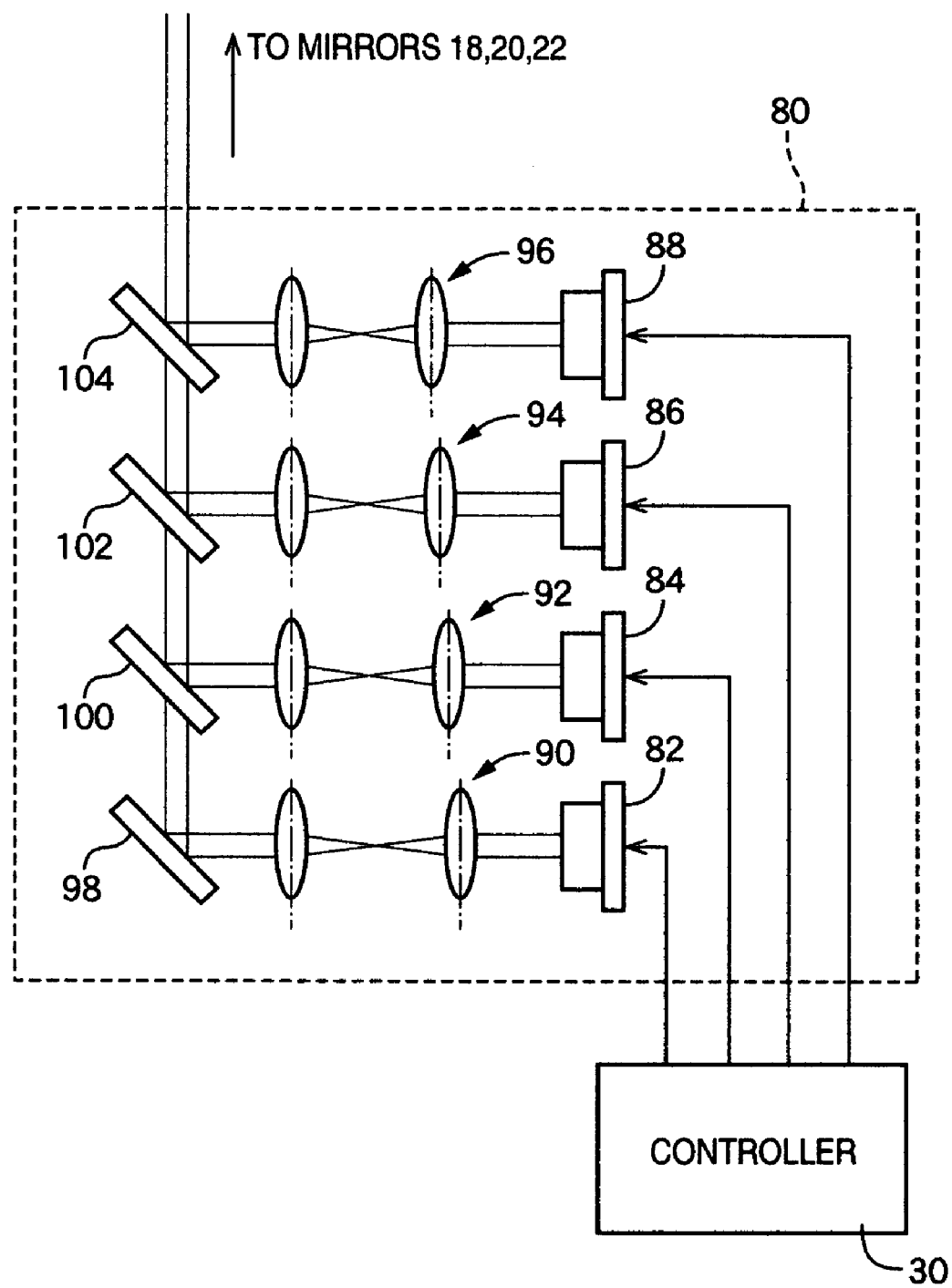
FIG. 12 schematically illustrates the construction of a laser emitter of a retinal scanning display constructed according to a fourth embodiment of the present invention.

Referring then to FIG. 12, there is illustrated in optical path diagram only a relevant portion of a retinal scanning display according to the present embodiment. The present embodiment includes three laser emitters for generation and wavefront-curvature-modulation of three colored laser light beams, similarly with the first to third embodiments. In view of the fact that these laser emitters are basically common in construction to each other, FIG. 12 illustrates only one of the three laser emitters as a representative laser emitter 80.

As illustrated in FIG. 12, the laser emitter 80, describing roughly, includes a laser generator and an optical system, for each of a plurality of discrete values of the wavefront curvature.

Describing more specifically, for the generation of parallel laser light, i.e., laser light whose wavefront curvature is zero, the laser emitter 80 includes: a first laser generator 82 generating laser light in the form of parallel light; a first fixed lens array 90 in which two lenses are coaxially arrayed and spaced a fixed distance apart from each other; and a total reflection mirror 98.

In the first fixed lens array 90, laser light, upon entry into one of the two lenses from the first laser generator 82, leaves the other lens toward the total reflection mirror 98 in the form of parallel light.

For the generation of diverging laser light, i.e., laser light whose wavefront curvature is larger than that of parallel light, the laser emitter 80 further includes: a second laser generator 84 generating laser light in the form of parallel light; a second fixed lens array 92 in which two lenses are coaxially arrayed and spaced apart from each other a fixed distance smaller than that of the first fixed lens array 90; and a partially-transmissible reflection mirror 100 coaxial with the total reflection mirror 98.

In the second fixed lens array 92, laser light, upon entry into one of the two lenses from the second laser generator 84, leaves the other lens toward the partially-transmissible reflection mirror 100 in the form of first diverging light. The partially-transmissible mirror 100 causes the first diverging light incident thereon to be reflected off, while causes the parallel light incident thereon from the total reflection mirror 98 to pass through along the same optical path as that of the incident parallel light.

For the generation of diverging laser light having a larger divergence angle than that of the first diverging light, i.e., laser light whose wavefront curvature is larger than that of the first diverging light, the laser emitter 80 further includes: a third laser generator 86 generating laser light in the form of parallel light; a third fixed lens array 94 in which two lenses are coaxially arrayed and spaced apart from each other a fixed distance smaller than that of the second fixed lens array 92; and a partially-transmissible reflection mirror 102 coaxial with the total reflection mirror 98 and the partially-transmissible reflection mirror 100.

In the third fixed lens array 94, laser light, upon entry into one of the two lenses from the third laser generator 86, leaves the other lens toward the partially-transmissible reflection mirror 102 in the form of second diverging light. The partially-transmissible mirror 102 causes the second diverging light incident thereon to be reflected off, while causes the parallel light or the first diverging light incident thereon from the total reflection mirror 98 or the partially-transmissible reflection mirror 100 to pass through along the same optical path as that of the incident parallel light or the first diverging light.

For the generation of diverging laser light having a larger divergence angle than that of the second diverging light, i.e., laser light whose wavefront curvature is larger than that of the second diverging light, the laser emitter 80 further includes: a fourth laser generator 88 generating laser light in the form of parallel light; a fourth fixed lens array 96 in which two lenses are coaxially arrayed and spaced apart from each other a fixed distance smaller than that of the third fixed lens array 94; and a partially-transmissible reflection mirror 104 coaxial with the total reflection mirror 98 and the partially-transmissible reflection mirrors 100 and 102.

In the fourth fixed lens array 96, laser light, upon entry into one of the two lenses from the fourth laser generator 88, leaves the other lens toward the partially-transmissible reflection mirror 104 in the form of third diverging light. The partially-transmissible mirror 104 causes the third diverging light incident thereon to be reflected off, while causes the parallel light or the first or second diverging light incident thereon from the total reflection mirror 98 or the partially-transmissible reflection mirror 100 or 102 to pass through along the same optical path as that of the incident parallel light or the first or second diverging light.

Each of these parallel light, and first, second, and third diverging light, upon exit from the respective laser emitters 80, 80, 80, enters a corresponding one of the mirrors 18, 20, 22 illustrated in FIG. 1.

As illustrated in FIG. 12, the controller 30 is adapted to control the level of the output intensity of laser light emitted from each laser generator 82, 84, 86, 88 (including an on- and an off-state of each laser generator 82, 84, 86, 88).

In operation of each color-by-color laser emitter 80, laser light, upon emission from each laser generator 82, 84, 86, 88, is outputted through each corresponding one of the separate fixed lens arrays 90, 92, 94, 96. These fixed lens arrays 90, 92, 94, 96, because of the mutual differences in distance between the incorporated two lenses, modulate the corresponding laser light beams incident thereon from the corresponding laser generators 82, 84, 86, 88, so as to have different wavefront curvatures.

Therefore, the present embodiment, because of the controller 30 being capable of selecting one of the plurality of laser generators 82, 84, 86, 88 as an active laser generator outputting laser light, facilitates an instantaneous modification in wavefront curvature of the laser light emitted from the laser emitter 80.

As is evident from the above explanation, in the present embodiment, a combination of the plurality of laser generators 82, 84, 86, 88, the corresponding fixed lens arrays 90, 92, 94, 96, and the corresponding mirrors 100, 102, 104, 106 constitutes an example of the "plurality of light emitting devices" set forth in the above mode (7), and the controller 30 constitutes an example of the "selector" set forth in the same mode.

It is added that, in the present embodiment, each laser emitter 80 is capable of generating a plurality of laser light beams different in wavefront curvature independently of each other, on a per color-of-light basis, and a selected one of the plurality of laser light beams enters the scanning mirror 24, on a per color-of-light basis.

In contrast, it is theoretically possible to operate each laser emitter 80 in a manner that the plurality of laser generators 82, 84, 86, 88 emit a plurality of laser light beams, respectively, concurrently with each other. In this mode, it is possible to combine and output a plurality of laser light beams different in wavefront curvature into a single laser light beam. Therefore, this mode allows the viewer to perceive a superposed image made of a plurality of sub-images different in depth (like a composite image in which a translucent sub-image is superposed on a separate sub-image in front thereof, for example).

It is further added that, although any one of the preceding embodiments described above adapts an arrangement in which the projection mirror 26 as reflective optics causes the laser light, upon being scanned by the scanning mirror 24, to be directed to and to converge at the pupil 2 of the viewer, any alternative arrangement may be employed for achieving the same purpose.

For example, one alternative arrangement may be employed in which a lens as refractive optics causes the laser light, upon being scanned by the scanning mirror 24, to be directed to and to converge at the pupil 2 of the viewer, and another alternative arrangement may be employed in which a diffractive optical device causes the laser light, upon being scanned by the scanning mirror 24, to be directed to and to converge at the pupil 2 of the viewer.

The present invention may be practiced with any of the above alternative arrangements in which the amount of change in wavefront curvature of laser light due to the lens or the diffractive optical device is varied with changes in entrance position at which the laser light enters the lens or the diffractive optical device from the scanning mirror 24.

In practicing the present invention with the above alternative arrangements, if the wavefront curvature of the laser light emitted from each laser generator 12, 14, 16 is compensated depending on the amount of change in wavefront curvature, then the viewer is capable of accurately perceiving an image, despite of the above-described optical property of the lens or the diffractive optical device.

It is still further added that, although any one of the preceding embodiments described above is constructed such that the scanner is embodied as the scanning mirror 24 in the form of an angularly oscillating mirror enabling a two-dimensional scanning operation, the scanner is not limited to that.

For example, the present invention may be practiced in an arrangement in which the scanning mirror 24 is replaced with a combination of a first scanning mirror which causes laser light to be deflected only in the primary scanning direction, and a second scanning mirror which causes laser light to be deflected only in the secondary scanning direction.

In this arrangement, the laser light, upon being combined by the total reflection mirror 18 and the partially-transmissible mirrors 20, 22, passes through the first and the second scanning mirror sequentially, and eventually enters the projection mirror 26. In this arrangement, for the order in which the laser light sequentially passes through the first and the second scanning mirror, any one of the first and the second scanning mirror can be a preceding one.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for use in an image display, of projecting a light beam onto a retina of a viewer, to thereby allow the viewer to perceive an image, the apparatus comprising:
    a light emitter emitting a light beam;
    a scanner scanning the light beam emitted by the light emitter;
    an optical system receiving the light beam scanned by the scanner as an incoming light beam, and emitting the incoming light beam as an outgoing light beam, such that the outgoing light beam becomes different in a traveling direction from the incoming light beam, so as to be directed to a pupil of the viewer;
    a curvature compensator compensating a wavefront curvature of the incoming light beam; and
    a detector detecting a value of the physical quantity,
    wherein the curvature compensator compensates the curvature of the wavefront of the incoming light beam, based on an entrance position at which the incoming light beam enters the optical system, and the detected value of the physical quantity.

2. An apparatus for use in an image display, of projecting a light beam onto a retina of a viewer, to thereby allow the viewer to perceive an image, the apparatus comprising:
    a light emitter emitting a light beam;
    a scanner scanning the light beam emitted by the light emitter;

an optical system receiving the light beam scanned by the scanner as an incoming light beam, and emitting the incoming light beam as an outgoing light beam, such that the outgoing light beam becomes different in a traveling direction from the incoming light beam, so as to be directed to a pupil of the viewer;

a curvature compensator compensating a wavefront curvature of the incoming light beam;

a detector detecting a value of the physical quantity; and a storage storing a plurality of sets of optical property information each defining a relationship between an entrance position at which the incoming light beam enters the optical system, and an amount of change in wavefront curvature of the light beam occurring when the light beam travels via the optical system, for a plurality of values which the physical quantity can take, wherein the curvature compensator compensates the wavefront curvature of the incoming light beam, based on one of the plurality of sets of optical property information which corresponds to the detected value of the physical quantity.

3. An apparatus for use in an image display, of projecting a light beam onto a retina of a viewer, to thereby allow the viewer to perceive an image, the apparatus comprising:

a light emitter emitting a light beam;

a scanner scanning the light beam emitted by the light emitter;

an optical system receiving the light beam scanned by the scanner as an incoming light beam, and emitting the incoming light beam as an outgoing light beam, such that, upon modulation of the light beam with respect to a traveling direction of the light beam, the outgoing light beam is directed to a pupil of the viewer; and a curvature compensator compensating a wavefront curvature of the incoming light beam, wherein an amount of change in the wavefront curvature of the incoming light beam occurring when the incoming light beam travels via the optical system changes as an entrance position of the incoming light beam into the optical system changes, and wherein the curvature compensator compensates the wavefront curvature of the incoming light beam, based on the entrance position at which the incoming light beam enters the optical system.

4. The apparatus according to claim 3, wherein the curvature compensator compensates the wavefront curvature of the incoming light beam to achieve a desired value of a wavefront curvature of the outgoing light beam advancing toward the pupil of the viewer, based on optical property information defining a relationship between the entrance position and an amount of change in the wavefront curvature of the incoming light beam occurring when the incoming light beam travels via the optical system.

5. The apparatus according to claim 3, further comprising a storage storing optical property information defining a relationship between the entrance position and an amount of change in wavefront curvature of the incoming light beam occurring when the incoming light beam travels via the optical system, wherein the curvature compensator compensates the wavefront curvature of the incoming light beam to achieve a desired value of a wavefront curvature of the outgoing light beam advancing toward the pupil of the viewer, based on the optical property information stored in the storage.

6. The apparatus according to claim 3, wherein the light emitter comprises:

a plurality of light emitting devices emitting a plurality of light beams different in wavefront curvature from each other, respectively; and a selector selecting one of the plurality of light emitting devices as an active light emitting device emitting the light beam, wherein the curvature compensator compensates the wavefront curvature of the incoming light beam, using the selector.

7. The apparatus according to claim 6, further comprising a controller controlling the image display by controlling the curvature compensator to compensate the wavefront curvature of the incoming light beam, using the selector.

8. The apparatus according to claim 3, wherein the optical system is shaped to have an entrance surface extending in two opposite directions, wherein the scanner scans the light beam emitted by the light source, such that the incoming light beam is two-dimensionally scanned on the entrance surface in the two opposite directions, wherein the entrance position is two-dimensionally defined with respect to the two opposite directions, and wherein the curvature compensator calculates a modulation amount by which the wavefront curvature of the incoming light beam is to be modulated for compensation, based on the two-dimensionally-defined entrance position.

9. The apparatus according to claim 8, wherein the curvature compensator calculates the modulation amount of the wavefront curvature of the incoming light beam, based on the two-dimensionally-defined entrance position, a first traveling distance of the light beam between the light emitter and the optical system, and a second traveling distance of the light beam between the optical system and an eye of the viewer.

10. An apparatus for use in an image display, of projecting a light beam onto a retina of a viewer, to thereby allow the viewer to perceive an image, the apparatus comprising:

a light emitter emitting a light beam;

a scanner scanning the light beam emitted by the light emitter;

an optical system receiving the light beam scanned by the scanner as an incoming light beam, and emitting the incoming light beam as an outgoing light beam, such that, upon modulation of the light beam with respect to a traveling direction of the light beam, the outgoing light beam is directed to a pupil of the viewer; and wherein an amount of change in the wavefront curvature of the incoming light beam as corresponds to a change in an entrance position of the incoming light beam into the optical system and wherein the curvature compensator compensates the wavefront curvature of the incoming light beam, based on the entrance position at which the incoming light beam enters the optical system, and the physical quantity a curvature compensator compensating a wavefront curvature of the incoming light beam, based on a physical quantity affecting an amount of change in wavefront curvature of the light beam occurring when the light beam travels via the optical system.

* * * * *